(12) United States Patent
Shimizu et al.

(10) Patent No.: US 6,677,061 B2
(45) Date of Patent: Jan. 13, 2004

(54) MAGNETIC RECORDING MEDIUM, PRODUCTION PROCESS THEREOF, AND MAGNETIC RECORDING AND REPRODUCING APPARATUS

(75) Inventors: Kenji Shimizu, Chiba (JP); Akira Sakawaki, Chiba (JP); Hiroshi Sakai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/152,675

(22) Filed: May 23, 2002

(65) Prior Publication Data

US 2003/0091868 A1 May 15, 2003

Related U.S. Application Data

(60) Provisional application No. 60/293,996, filed on May 30, 2001.

(30) Foreign Application Priority Data

May 23, 2001 (JP) ........................ P2001-154448

(51) Int. Cl.$^7$ .......................... G11B 5/66; G11B 5/667; G11B 5/20; B05D 5/12; C23C 14/34
(52) U.S. Cl. ........................ 428/694 TS; 428/694 TM; 428/694 TP; 428/900; 427/128; 427/131; 204/192.2
(58) Field of Search ................. 428/694 TS, 694 TM, 428/694 TP, 900; 427/128, 131; 204/192.2

(56) References Cited

U.S. PATENT DOCUMENTS 5,873,955 A * 2/1999 Kirino et al. ............... 148/306

* cited by examiner

*Primary Examiner*—Holly Rickman
(74) *Attorney, Agent, or Firm*—Sughrue Mion, PLLC

(57) ABSTRACT

A magnetic recording medium exhibiting excellent recording and reproduction characteristics is disclosed. A magnetic recording medium includes a non-magnetic substrate 1; a soft magnetic undercoat film 2; an orientation-regulating film 3; a perpendicular magnetic film 4; and a protective film 5, the films being formed on the substrate 1. The soft magnetic undercoat film 2 contains a material represented by the following composition:

$$aFe\text{-}bCo\text{-}cM\text{-}dX1\text{-}fN$$

where M is one or more elements selected from Ti, Zr, Nb, Hf, Ta, V, and Mo; X1 is one or more elements selected from Cr, Ga, Al, Si, and Ni; and a, b, c, d, and f represent atomic percentages and satisfy the following relations: $60 \leq a+b \leq 90$, $30 \leq a \leq 90$, $5 \leq c \leq 20$, $0.1 \leq d \leq 7$, and $3 \leq f \leq 30$.

21 Claims, 5 Drawing Sheets

MAGNETIC RECORDING MEDIUM, PRODUCTION PROCESS THEREOF, AND MAGNETIC RECORDING AND REPRODUCING APPARATUS

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/293,996 filed May 30, 2001 pursuant to 35 U.S.C. §111(b).

FIELD OF THE INVENTION

The present invention relates to a magnetic recording medium, to a process for producing the medium, and to a magnetic read/write apparatus including the medium.

BACKGROUND OF THE INVENTION

Most conventional magnetic recording media are of a longitudinal recording type, in which easy-magnetization axes in a magnetic film are mostly (more than 50%) oriented horizontally with respect to a substrate.

When recording density is increased in such a longitudinal magnetic recording medium, bit volume becomes excessively small, and read/write properties of the medium may deteriorate as a result of thermal instability. In addition, when recording density is increased, the effect of a diamagnetic field at a recording bit boundary causes an increase in medium noise.

In contrast, in a perpendicular magnetic recording medium, in which easy-magnetization axes in a magnetic film are mostly (more than 50%) oriented vertically with respect to a substrate, even when recording density is increased, the effect of a diamagnetic field at a recording bit boundary is minimal, and recording magnetic domains having clear boundaries are formed, thus enabling noise reduction. Furthermore, even when bit volume is relatively large, recording density can be increased, and thus thermal decay can be enhanced. Therefore, a perpendicular magnetic recording medium has recently become of interest.

In recent years, there has been a demand for magnetic recording media of higher recording density.

In order to increase recording density, a single-pole head exhibiting excellent ability to record data onto a perpendicular magnetic film is employed. Therefore, there has been proposed a magnetic recording medium including a film formed from a soft magnetic material (called a "backing layer") provided between a substrate and a perpendicular magnetic film serving as a recording layer. Such a magnetic recording medium is advantageous in that the ratio of magnetic flux into the medium to magnetic flux from the single-pole head can be enhanced.

However, the aforementioned magnetic recording medium including a soft magnetic film (a backing layer) is not satisfactory in terms of read/write properties, and thus there has been a demand for a magnetic recording medium which exhibits excellent read/write properties.

Japanese Patent Application Laid-Open (kokai) No. 2-152208 discloses a magnetic recording medium including a soft magnetic film (a backing layer) formed from Co (50 to 75 at %)–M' (wherein M' is Ti, Zr, Hf, Nb, Ta, Mo, or W) (4 to 25 at %)–N (1 to 35 at %).

In general, saturation magnetization of a soft magnetic film formed from a Co alloy is lowered when the Co content is less than 85 at %. Therefore, the soft magnetic film must be thickened, resulting in high surface roughness.

Thus, in the case of the aforementioned magnetic recording medium, the flying height of a magnetic head (the distance between the top surface of the magnetic recording medium and the lower surface of the magnetic head) cannot be reduced sufficiently during read/write of data, resulting in difficulty in attaining high recording density. In addition, formation of a thick soft magnetic film results in lowered productivity.

Japanese Patent Application Laid-Open (kokai) No. 11-149628 discloses a magnetic recording medium including a soft magnetic undercoat film formed from an FeAlSi alloy or an FeTaN alloy, which medium prevents generation of sporadic spike noise and improves envelope properties.

Although the aforementioned magnetic recording medium exhibits improved envelope properties, the medium generates increased medium noise attributed to the soft magnetic undercoat film. This is because, micronized crystal grains of the soft magnetic undercoat film increase magnetic bonding between the crystal grains, resulting in an increase in magnetic cluster size (i.e., size of magnetically bonded grains).

SUMMARY OF THE INVENTION

In view of the foregoing, an object of the present invention is to provide a magnetic recording medium which enables reduction of medium noise generated from a soft magnetic undercoat film, to thereby improve read/write properties and to attain high read/write density; a process for producing the medium; and a magnetic read/write apparatus including the medium.

In order to attain the aforementioned object, the present invention provides the following.

The magnetic recording medium of the present invention comprises a non-magnetic substrate; a soft magnetic undercoat film containing at least a soft magnetic material; an orientation-regulating film for regulating the crystal orientation of a film provided directly thereon; a perpendicular magnetic film in which easy-magnetization axes are mostly oriented vertically with respect to the substrate; and a protective film, the films being formed on the substrate, wherein the soft magnetic undercoat film contains a material represented by the following composition:

aFe-bCo-cM-dX1b-fN wherein M is one or more elements selected from the group consisting of Ti, Zr, Nb, Hf, Ta, V, and Mo; X1 is one or more elements selected from the group consisting of Cr, Ga, Al, Si, and Ni; and a, b, c, d, and f represent atomic percentages and satisfy the following relations: $60 \leq a+b \leq 90$, $30 \leq a \leq 90$, $5 \leq c \leq 20$, $0.1 \leq d \leq 7$, and $3 \leq f \leq 30$.

The soft magnetic undercoat film may contain a material represented by the following composition:

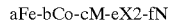
aFe-bCo-cM-eX2-fN wherein M is one or more elements selected from the group consisting of Ti, Zr, Nb, Hf, Ta, V, and Mo; X2 is one or more elements selected from the group consisting of P, C, B, and O; and a, b, c, e, and f represent atomic percentages and satisfy the following relations: $60 \leq a+b \leq 90$, $30 \leq a \leq 90$, $5 \leq c \leq 20$, $0.1 \leq e \leq 10$, and $3 \leq f \leq 30$.

The soft magnetic undercoat film may contain a material represented by the following composition:

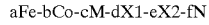
aFe-bCo-cM-dX1-eX2-fN wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O; and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$.

Preferably, the aforementioned a through f satisfy the following relations: $60 \leq a+b \leq 80$, $30 \leq a \leq 80$, $5 \leq c \leq 20$, $0.1 \leq d \leq 3$, $0.1 \leq e \leq 5$, and $8 \leq f \leq 25$.

Preferably, the soft magnetic undercoat film comprises fine crystals containing Fe as a primary component and having an average grain size of 13 nm or less, and an amorphous phase containing M (M is one or more elements selected from the group consisting of Ti, Zr, Nb, Hf, Ta, V, and Mo) and N in amounts greater than those contained in the fine crystals.

Preferably, the fine crystals have a bcc structure.

Preferably, the soft magnetic undercoat film has a saturated magnetic flux density (Bs) of at least 1 T. More preferably, the soft magnetic undercoat film has a saturated magnetic flux density of at least 1.4 T.

The product of the saturated magnetic flux density (Bs) and thickness (t) of the soft magnetic undercoat film; i.e., Bs·t, is preferably at least 50 T·nm, more preferably at least 100 T·nm.

The orientation-regulating film may comprise an hcp-structure material containing one or more elements selected from the group consisting of Ti, Zn, Y, Zr, Ru, Re, Gd, Tb, and Hf in a total amount of at least 50at %.

The orientation-regulating film may comprise an fcc-structure material containing one or more elements selected from the group consisting of Ni, Cu, Pd, Ag, Pt, Ir, Au, and Al in a total amount of at least 50at %.

Preferably, a portion or the entirety of a surface of the soft magnetic undercoat film facing the perpendicular magnetic film is oxidized.

Preferably, the perpendicular magnetic film has a nucleation field (−Hn) of at least 0 (Oe).

The process of the present invention for producing a magnetic recording medium comprises forming, in order, on a non-magnetic substrate, a soft magnetic undercoat film containing at least a soft magnetic material, an orientation-regulating film for regulating the crystal orientation of a film provided directly thereon, a perpendicular magnetic film in which easy-magnetization axes are mostly oriented vertically with respect to the substrate, and a protective film, characterized in that the soft magnetic undercoat film is formed so as to contain a material represented by the following composition:

wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$.

In the production process of the present invention, preferably, the soft magnetic undercoat film comprises fine crystals containing Fe as a primary component and having an average grain size of 13 nm or less, and an amorphous phase containing M (M is one or more elements selected from the group consisting of Ti, Zr, Nb, Hf, Ta, V, and Mo) and N in amounts greater than those contained in the fine crystals.

In the production process of the present invention, preferably, the soft magnetic undercoat film is formed through sputtering, and a gas employed for film formation contains nitrogen in an amount of 0.1 to 50 vol %.

In the present invention, preferably, after the soft magnetic undercoat film is formed, the soft magnetic undercoat film is subjected to heat treatment at 250° C. to 450° C.

The magnetic read/write apparatus of the present invention comprises a magnetic recording medium and a magnetic head for recording data onto the medium and reproducing the data therefrom, wherein the magnetic head is a single-pole head, and the magnetic recording medium comprises a non-magnetic substrate, a soft magnetic undercoat film containing at least a soft magnetic material, an orientation-regulating film for regulating the crystal orientation of a film provided directly thereon, a perpendicular magnetic film in which easy-magnetization axes are mostly oriented vertically with respect to the substrate, and a protective film, the films being formed on the substrate, wherein the soft magnetic undercoat film contains a material represented by the following composition:

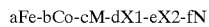

wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O; and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$.

Preferably, the soft magnetic undercoat film comprises fine crystals containing Fe as a primary component and having an average grain size of 13 nm or less, and an amorphous phase containing M (M is one or more elements selected from the group consisting of Ti, Zr, Nb, Hf, Ta, V, and Mo) and N in amounts greater than those contained in the fine crystals.

DETAILED DESCRIPTION OF THE INVENTION

Figure 1:
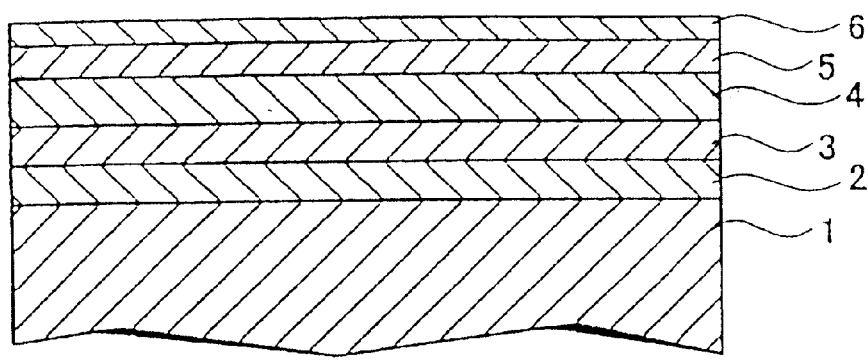
FIG. 1 is a partial cross-sectional view showing a first embodiment of the magnetic recording medium of the present invention.

FIG. 1 shows a first embodiment of the magnetic recording medium of the present invention. The magnetic recording medium includes a non-magnetic substrate 1; a soft magnetic undercoat film 2; an orientation-regulating film 3; a perpendicular magnetic film 4; a protective film 5; and a lubrication film 6, the films 2 through 6 being successively formed on the substrate 1.

The non-magnetic substrate 1 may be a metallic substrate formed from a metallic material such as aluminum or an aluminum alloy, or a non-metallic substrate formed from a non-metallic material such as glass, ceramic, silicon, silicon carbide, or carbon.

A glass substrate may be formed from amorphous glass or glass ceramic. Amorphous glass may be general-purpose glass, such as soda-lime glass or aluminosilicate glass. Glass ceramic may be lithium-based glass ceramic. Meanwhile, a ceramic substrate may be formed from a general-purpose sintered compact predominantly containing aluminum oxide, aluminum nitride, and silicon nitride; or fiber-reinforced material thereof.

The non-magnetic substrate 1 may be any of metallic or non-metallic substrates coated with NiP film through plating or sputtering.

The surface configuration of the non-magnetic substrate 1 affects the surface configuration of the medium. Therefore, in order to reduce the flying height of a magnetic head during read/write of data, the average surface roughness (Ra) of the non-magnetic substrate 1 is preferably 2 nm or less.

When the average surface roughness (Ra) is 2 nm or less, irregularities of the surface of the magnetic recording medium can be reduced, and the flying height of a magnetic head can be reduced sufficiently during read/write of data, thereby enhancing recording density.

The soft magnetic undercoat film 2 is provided for increasing a perpendicular component of magnetic flux of a magnetic head and for causing the perpendicular magnetic film 4 to be magnetized in a direction perpendicular to the substrate 1.

In the magnetic recording medium of the first embodiment, the soft magnetic undercoat film 2 may contain a material represented by the following formula (1):

$$aFe\text{-}bCo\text{-}cM\text{-}dX1\text{-}fN \quad (1)$$

(wherein M is one or more elements selected from the group of consisting of Ti, Zr, Nb, Hf, Ta, V, and Mo; X1 is one or more elements selected from the group of consisting of Cr, Ga, Al, Si, and Ni; and a, b, c, d, and f represent atomic percentages (at %) and satisfy the following relations: $60 \leq a+b \leq 90$, $30 \leq a \leq 90$, $5 \leq c \leq 20$, $0.1 \leq d \leq 7$, and $3 \leq f \leq 30$).

More preferably, a through f satisfy the following relations: $60 \leq a+b \leq 80$, $30 \leq a \leq 80$, $5 \leq c \leq 20$, $0.1 \leq d \leq 3$, and $8 \leq f \leq 25$.

The soft magnetic undercoat film 2 preferably contains the material represented by formula (1) as a primary component. As used herein, the term "primary component" refers to a component which is contained in an amount of more than 50 at %.

Specific examples of the material represented by formula (1) include FeHfCrN, FeHfAlN, FeHfSiN, FeHfGaN, FeHfCrAlN, FeZrCrN, FeTaCrN, FeNbCrN, FeTiCrN, and FeCoHfCrN.

The soft magnetic undercoat film 2 may contain a material represented by the following formula (2):

$$aFe\text{-}bCo\text{-}cM\text{-}eX2\text{-}fN \quad (2)$$

(wherein M is one or more elements selected from the group consisting of Ti, Zr, Nb, Hf, Ta, V, and Mo; X2 is one or more elements selected from the group of consisting P, C, B, and O; and a, b, c, e, and f represent atomic percentages and satisfy the following relations: $60 \leq a+b \leq 90$, $30 \leq a \leq 90$, $5 \leq c \leq 20$, $0.1 \leq e \leq 10$, and $3 \leq f \leq 30$).

More preferably, a through f satisfy the following relations: $60 \leq a+b \leq 80$, $30 \leq a \leq 80$, $5 \leq c \leq 20$, $0.1 \leq e \leq 5$, and $8 \leq f \leq 25$.

The soft magnetic undercoat film 2 preferably contains the material represented by formula (2) as a primary component.

Specific examples of the material represented by formula (2) include FeHfBN, FeHfCN, FeHfPN, FeHfON, FeHfBCN, FeZrBN, FeTaBN, FeNbBN, FeTiBN, and FeHfAlCON.

The soft magnetic undercoat film 2 may contain a material represented by the following formula (3):

$$aFe\text{-}bCo\text{-}cM\text{-}dX1\text{-}eX2\text{-}fN \quad (3)$$

(wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O; and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$).

More preferably, a through f satisfy the following relations: $60 \leq a+b \leq 80$, $30 \leq a \leq 80$, $5 \leq c \leq 20$, $0.1 \leq d \leq 3$, $0.1e \leq 5$, and $8 \leq f \leq 25$.

The soft magnetic undercoat film 2 preferably contains the material represented by formula (3) as a primary component.

Specific examples of the material represented by formula (3) include FeHfCrBN, FeHfAlBN, FeHfAlPN, FeHfCrAlBN, and FeHfCrBPN.

When the total amount of Fe and Co (i.e., a+b) falls below the above range, saturated magnetic flux density is lowered. Therefore, there arises a need to increase the thickness of the soft magnetic undercoat film 2, but the increased thickness entails an increased average surface roughness (Ra). As a result, the flying height of a magnetic head cannot be reduced sufficiently during read/write of data, and attainment of high recording density becomes difficult.

In contrast, when the total amount of Fe and Co exceeds the above range, attaining sufficient noise reduction is difficult.

When the amount of Fe (i.e., a) falls below the above range, saturated magnetic flux density is lowered. Therefore, there arises a need to increase the thickness of the soft magnetic undercoat film 2, but the increased thickness entails an increased average surface roughness (Ra). As a result, the flying height of a magnetic head cannot be reduced sufficiently during read/write of data, and attainment of high recording density becomes difficult.

In contrast, when the amount of Fe exceeds the above range, attaining sufficient noise reduction is difficult.

When the amount of M (i.e., c) falls below the above range, the noise reduction effect exerted by the soft magnetic undercoat film 2 is lowered, whereas when the amount of M exceeds the above range, the entirety of the soft magnetic undercoat film 2 becomes amorphous, possibly resulting in deterioration of noise characteristics.

When the amount of N (i.e., f) falls below the above range, the crystal grain size of the soft magnetic undercoat film 2 tends to become large, whereas when the amount of N exceeds the above range, the saturated magnetic flux density of the soft magnetic undercoat film 2 is lowered.

When the amount of X1 (i.e., d) falls below the above range, the effect of micronizing crystal grains is lowered, and the crystal grain size becomes large, resulting in an increase in noise.

In contrast, when the amount of X1 exceeds the above range, magnetization of the soft magnetic undercoat film 2 tends to become insufficient. In addition, medium noise generated from the soft magnetic undercoat film 2 increases.

When the amount of X2 (i.e., e) falls below the above range, crystal grains becomes large, and medium noise increases.

In contrast, when the amount of X2 exceeds the above range, magnetization of the soft magnetic undercoat film 2 tends to become insufficient. In addition, medium noise generated from the soft magnetic undercoat film 2 increases.

Preferably, the soft magnetic undercoat film 2 contains fine crystals containing Fe as a primary component, and an amorphous phase containing M (M is one or more elements selected from the group consisting of Ti, Zr, Nb, Hf, Ta, V, and Mo) and N in amounts greater than those contained in the fine crystals.

Figure 2:
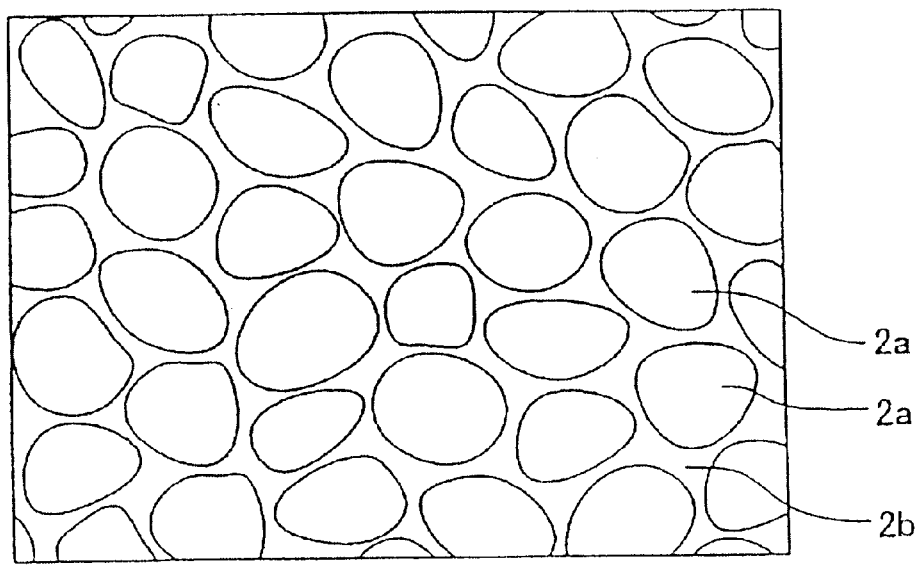
FIG. 2 shows the structure of the soft magnetic undercoat film of the magnetic recording medium shown in FIG. 1.

FIG. 2 shows an exemplary soft magnetic undercoat film 2 containing fine crystals and an amorphous phase. The soft magnetic undercoat film 2 shown in FIG. 2 has a structure including numerous fine crystals 2a and an amorphous phase 2b which separates the fine crystals 2a from one another.

The average grain size of the fine crystals 2a is 13 nm or less, preferably 10 nm or less. When the crystal grain size falls within the above range, the size of magnetic clusters in the soft magnetic undercoat film 2 and the perpendicular magnetic film 4 can be reduced, and medium noise can be reduced, thereby attaining improved read/write properties.

The average grain size of the fine crystals 2a can be obtained on the basis of an image as observed by use of a transmission electron microscope (TEM). Specifically, an image of the fine crystals 2a as observed by use of TEM is subjected to computer processing, to thereby transform the shape of each of the fine crystals 2a into a circle having the same area as the crystal. The diameter of the resultant circle is considered the grain size of the fine crystal 2a.

In a manner similar to that described above, the grain sizes of a plurality of the fine crystals 2a are measured, and the resultant grain sizes are averaged, to thereby obtain the average grain size of the fine crystals 2a. The number of the fine crystals 2a employed for measurement of grain size is preferably at least 100, more preferably at least 500.

The fine crystals 2a preferably have a bcc structure. This is because, when the fine crystals 2a have a bcc structure, saturated magnetic flux density can be increased effectively. The predominant orientation plane of the fine crystals 2a is preferably a (110) plane. The crystal structure and orientation plane of the crystals can be determined by means of X-ray diffraction (XRD).

The saturated magnetic flux density (Bs) of the soft magnetic undercoat film 2 is preferably at least 1 T, more preferably at least 1.4 T, much more preferably at least 1.6 T. When the saturated magnetic flux density (Bs) falls below the above range, the thickness of the soft magnetic undercoat film 2 must be increased, resulting in an increase in average surface roughness (Ra) and poor productivity.

The product of the saturated magnetic flux density (Bs) and thickness (t) of the soft magnetic undercoat film 2; i.e., Bs·t, is preferably at least 50 T·nm, more preferably at least 100 T·nm. When Bs·t is less than 50 T·nm, reproduction waveforms fail to become rectangular waves and assume distorted shapes, thereby deteriorating read/write properties.

A portion or the entirety of a surface of the soft magnetic undercoat film 2, the surface facing the perpendicular magnetic film 4, may be oxidized.

The thickness of the oxidized portion (oxidized layer) is preferably 3 nm or less, more preferably 2.5 nm or less, much more preferably 2 nm or less.

When the thickness of the oxidized portion exceeds 3 nm, the crystal orientation of the orientation-regulating film 3 which is provided on the film 2 is disturbed, thereby deteriorating read/write properties. In addition, when the thickness of the oxidized portion exceeds 3 nm, the surface of the soft magnetic undercoat film 2 is excessively oxidized, and the average surface roughness (Ra) of the film increases (e.g., the average surface roughness (Ra) becomes more than 2 nm). As a result, the flying height of a magnetic head cannot be reduced sufficiently during read/write of data, resulting in difficulty in attaining high recording density.

The state in which the soft magnetic undercoat film 2 is oxidized can be confirmed by means of, for example, Auger electron spectroscopy or SIMS. The thickness of the oxidized portion (oxidized layer) on the surface of the soft magnetic undercoat film 2 can be obtained on the basis of, for example, a photograph of the cross section of the medium as taken by use of a transmission electron microscope (TEM).

The coercive force (Hc) of the soft magnetic undercoat film 2 is preferably 100 (Oe) or less, more preferably 30 (Oe) or less, much more preferably 10 (Oe) or less.

When the coercive force (Hc) exceeds the above range, soft magnetic characteristics become insufficient, and a reproduction waveform fails to become a rectangular wave and assumes a distorted shape.

The maximum magnetic permeability of the soft magnetic undercoat film 2 is preferably 1,000 to 1,000,000, more preferably 100,000 to 500,000.

When the maximum magnetic permeability falls below the above range, writing of data onto the magnetic recording medium becomes insufficient during recording, and sufficient read/write properties may fail to be obtained. The magnetic permeability is represented by the CGS system of units.

The surface configuration of the soft magnetic undercoat film 2 affects the surface configuration of the magnetic recording medium. Therefore, the average surface roughness (Ra) of the film 2 is preferably 2 nm or less. When the average surface roughness (Ra) falls within the above range, irregularities of the surface of the magnetic recording medium can be reduced, and the flying height of a magnetic head can be reduced sufficiently during read/write of data, thereby enhancing recording density.

The orientation-regulating film 3 is provided for regulating the crystal orientation and crystal grain size of the perpendicular magnetic film 4.

The orientation-regulating film 3 preferably has an hcp structure or an fcc structure, in at least a surface facing the perpendicular magnetic film 4.

Examples of the hcp-structure material employed for forming the orientation-regulating film 3 include a material containing one or more elements selected from the group consisting of Ti, Zn, Y, Zr, Ru, Re, Gd, Tb, and Hf in a total amount of at least 50 at.

When an alloy containing Hf or Ru in an amount of at least 50 at % is employed, medium noise generated from the perpendicular magnetic film 4 can be reduced, and recording density can be increased. Particularly when Ru is employed, perpendicular orientation of the perpendicular magnetic film 4 can be enhanced.

In consideration of lattice matching with the perpendicular magnetic film 4, the hcp-structure material may be an alloy containing the aforementioned element (one or more elements selected from the group consisting of Ti, Zn, Y, Zr, Ru, Re, Gd, Th, and Hf) and another element such as Co, Cr, Fe, or Ni.

In order to micronize crystal grains, the hcp-structure material may be an alloy containing the aforementioned element (one or more elements selected from the group consisting of Ti, Zn, Y, Zr, Ru, Re, Gd, Tb, and Hf) and another element such as C, O, N, Si, B, or P.

Specific examples of the hcp-structure material preferably employed for forming the orientation-regulating film 3 include Ru, RuCr, Hf, HfB, and Re.

Preferred examples of the fcc-structure material employed for forming the orientation-regulating film 3 include a material containing one or more elements selected from the group consisting of Ni, Cu, Pd, Ag, Pt, Ir, Au, and Al in a total amount of at least 50 at %. Particularly when Ni is employed, preferably, perpendicular orientation of the perpendicular magnetic film 4 can be enhanced.

In consideration of lattice matching with the perpendicular magnetic film 4, the fcc-structure material may be an alloy containing the aforementioned element (one or more elements selected from the group consisting of Ni, Cu, Pd, Ag, Pt, Ir, Au, and Al) and another element such as Co, Cr, Fe, or Ni.

In order to micronize crystal grains, the fcc-structure material may be an alloy containing the aforementioned element (one or more elements selected from the group consisting of Ni, Cu, Pd, Ag, Pt, Ir, Au, and Al) and another element such as C, O, N, Si, B, or P.

Specific examples of the fcc-structure material preferably employed for forming the orientation-regulating film 3 include Ni, NiCrN, Cu, and PdB.

The thickness of the orientation-regulating film 3 is preferably 1 to 50 nm, more preferably 2 to 30 nm, much more preferably 2 to 20 nm.

When the thickness falls below the above range, the perpendicular orientation of the perpendicular magnetic film 4 is lowered, resulting in deterioration of read/write properties and thermal decay.

In contrast, when the thickness exceeds the above range, crystal grains in the perpendicular magnetic film 4 become large, and read/write properties are deteriorated. In addition, since the distance between the soft magnetic undercoat film 2 and a magnetic head becomes large during read/write of data, the resolution of a reproduced signal is lowered.

The perpendicular magnetic film 4 is formed from a magnetic material, in which easy-magnetization axes are mostly oriented vertically with respect to the substrate. (The term "mostly oriented" as used in describing all aspects of the present invention means more than 50% of the easy magnetization axes are oriented vertically with respect to the substrate). Preferred examples of the magnetic material include CoCrX3-based alloys, CoCrPt-based alloys, CoCrTa-based alloys, CoCrPtX3-based alloys, and CoPtX3-based alloys (X3: one or more elements selected from the group consisting of Ta, Zr, Nb, Cu, Re, Ni, Mn, Ge, Si, O, N, and B).

Particularly, in order to enhance the perpendicular magnetic anisotropy of the perpendicular magnetic film 4, the film 4 is preferably formed from a CoCrPtX3-based alloy (Pt content: 8 to 24 at %) or a CoPtX3-based alloy (Pt content: 8 to 24 at %). When the Pt content is 14 to 22 at %, the nucleation field (−Hn) reliably becomes 0 or more, and excellent thermal decay can be obtained.

The perpendicular magnetic film 4 may have a multi-layer structure in which layers formed from a transition metal material (e.g., Co, Co alloy, Fe, or Fe alloy) and layers formed from a noble metal material (e.g., Pd, Pd alloy, Pt, or Pt alloy) are laminated repeatedly.

For example, the perpendicular magnetic film 4 may have a multi-layer structure in which layers of Co, CoX4, Fe, or FeX4 and layers of Pd, PdX4, Pt, or PtX4 (X4: one or more elements selected from the group consisting of Cr, Pt, Ta, B, O, Ru, and Si) are laminated repeatedly.

The aforementioned materials for forming a multi-layer structure film, such as CoCr-based alloys, CoCrPt-based alloys, CoCrTa-based alloys, CoCrPtX3-based alloys, and CoPtX3-based alloys, have a polycrystalline structure. However, the magnetic recording medium of the present invention may employ a perpendicular magnetic film having an amorphous structure. Examples of the material having an amorphous structure include alloys containing a rare earth element, such as TbFeCo-based alloys.

The nucleation field (−Hn) of the perpendicular magnetic film 4 is preferably at least 0 (Oe), more preferably at least 1,000 (Oe). When the nucleation field (−Hn) falls below the above range, thermal decay is lowered.

Figure 3:
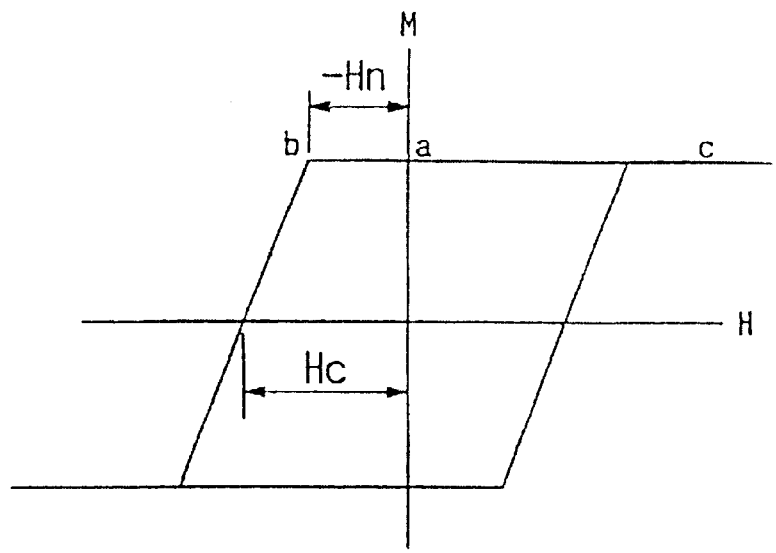
FIG. 3 is a graph showing an exemplary hysteresis loop.

The nucleation field (−Hn) can be represented by the distance (Oe) between a point "a" and a point "b" shown in the hysteresis loop (MH loop), as shown in FIG. 3. At the point a, the external magnetic field is zero. When the external magnetic field is reduced after saturation magnetization of the medium, magnetization of the medium is reversed at the point b.

Figure 4:
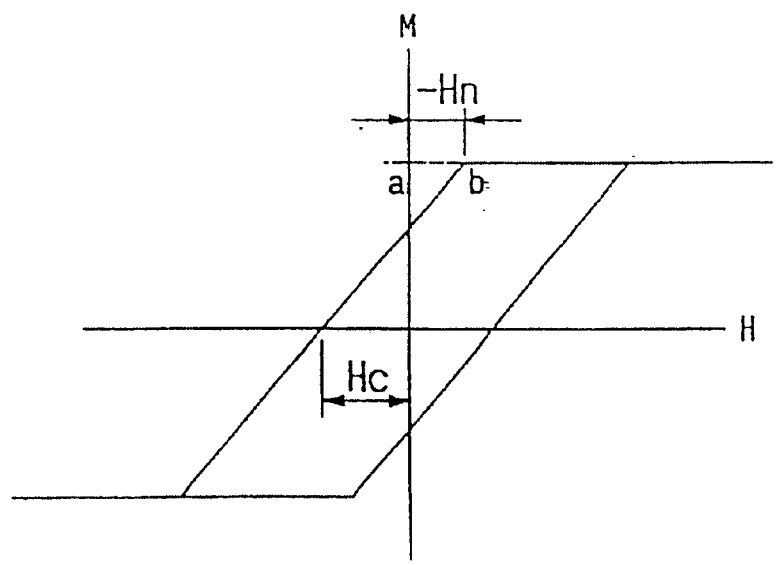
FIG. 4 is a graph showing another exemplary hysteresis loop.

When the point b is located within the region in which the external magnetic field is negative, the nucleation field (−Hn) becomes positive (see FIG. 3). In contrast, when the point b is located within the region in which the external magnetic field is positive, the nucleation field (−Hn) becomes negative (see FIG. 4).

When the nucleation field (−Hn) is measured, in order to eliminate the effect of the soft magnetic undercoat film 2, a disk including only the substrate 1, the orientation-regulating film 3, the perpendicular magnetic film 4, and the protective film 5 is employed. Preferably, the nucleation field of the disk is measured by use of a vibrating sample magnetometer or a Kerr effect measurement apparatus. The nucleation field (−Hn) of the magnetic recording medium may be measured by use of a vibrating sample magnetometer or a Kerr effect measurement apparatus.

The perpendicular magnetic film 4 may have a multi-layer structure including two or more layers having different compositions and crystal structures. For example, the film 4 may have a multi-layer structure including a plurality of magnetic layers and intermediate layers, each intermediate layer being formed between the magnetic layers, in which the intermediate layers have an hcp structure or an fcc structure.

A plurality of the magnetic layers may have the same composition and crystal structure, or they may have different compositions and crystal structures.

In consideration of lattice matching with the magnetic layers, the intermediate layers are preferably formed from the following material: an alloy containing Ru (or Re) and another element such as Co, Cr, Fe, Ni, C, O, N, Si, or B; an alloy containing Ni and another element such as Co, Cr, Fe, C, O, N, Si, or B; an alloy containing Co and another element such as Cr, Fe, Ni, C, O, N, Si, or B; an alloy containing CoCr and another element such as Fe, Ni, C, O, N, Si, or B; or Ni.

The coercive force (Hc) of the perpendicular magnetic film 4 is preferably at least 3,000 (Oe). When the coercive force (Hc) falls below the above range, recording characteristics and thermal decay are deteriorated.

The average crystal grain size of the perpendicular magnetic film 4 is preferably 4 to 15 nm. When the average grain size falls below the above range, coercive force and thermal decay tend to be lowered, whereas when the average grain size exceeds the above range, medium noise increases.

The average crystal grain size of the film 4 can be obtained in a manner similar to that employed for obtaining the average grain size of the aforementioned fine crystals 2a of the soft magnetic undercoat film 2.

The thickness of the perpendicular magnetic film 4 is preferably 5 to 50 nm, more preferably 7 to 30 nm.

When the thickness falls below the above range, the crystal orientation of the perpendicular magnetic film 4 tends to become insufficient, resulting in deterioration of read/write properties. In contrast, when the thickness exceeds the above range, crystal grains tend to become large, noise increases, and read/write properties deteriorate.

The protective film 5 is provided for preventing corrosion of the perpendicular magnetic film 4, protecting the surface of the magnetic recording medium from any damage when a magnetic head is brought into contact with the medium, and maintaining lubrication characteristics between the head and the medium. Conventionally known materials may be employed for forming the protective film 5. Examples of such materials include a single composition of C, $SiO_2$, or $ZrO_2$; and a composition containing C, $SiO_2$ or $ZrO_2$ as a primary component and other elements.

The thickness of the protective film 5 is preferably 1 to 10 nm.

The lubrication film 6 may be formed from a conventionally known lubricant such as perfluoropolyether, fluorinated alcohol, or fluorinated carboxylic acid. The type of the lubricant and the thickness of the film 6 may be appropriately determined in accordance with the properties of a protective film to be employed and the lubricant.

The magnetic recording medium having the aforementioned structure is produced as follows. Firstly, the soft magnetic undercoat film 2 is formed on the substrate 1 shown in FIG. 1 through, for example, sputtering. Subsequently, if desired, the surface of the soft magnetic undercoat film 2 is subjected to oxidation treatment, and then the orientation-regulating film 3 and the perpendicular magnetic film 4 are successively formed through, for example, sputtering.

Subsequently, the protective film 5 is formed by means of, for example, sputtering, CVD, or an ion-beam method. Thereafter, the lubrication film 6 is formed through, for example, dip coating or spin coating.

When the soft magnetic undercoat film 2 is formed, sputtering by use of a target containing the aforementioned materials represented by formulas (1) through (3) and containing no nitrogen may be carried out, and a gas containing nitrogen may be employed during film formation. The nitrogen content of the film formation gas is preferably 0.1 to 50 vol %.

The nitrogen-containing film formation gas may be a gas mixture of nitrogen and argon. When the nitrogen-containing film formation gas is employed, the soft magnetic undercoat film 2 can be formed uniformly.

When the surface of the soft magnetic undercoat film 2 is subjected to oxidation treatment, the following methods may be employed: a method in which the soft magnetic undercoat film 2 is exposed to an oxygen-containing gas after the film 2 is formed; and a method in which oxygen is introduced into the film formation gas employed for forming the soft magnetic undercoat film 2.

When the surface of the soft magnetic undercoat film 2 is exposed to an oxygen-containing gas, the film 2 may be brought into contact, for about 0.3 to 20 seconds, with a gas obtained by diluting oxygen with argon or nitrogen, or with pure oxygen. Alternatively, the soft magnetic undercoat film 2 may be exposed to air.

Particularly when a gas obtained by diluting oxygen with, for example, argon or nitrogen is employed, since the degree of oxidation of the surface of the soft magnetic undercoat film 2 can be easily regulated by varying the degree of dilution of oxygen, the surface of the film 2 can be oxidized to a desired level.

In the case where oxygen is introduced into the film formation gas employed for forming the soft magnetic undercoat film 2; for example, when the film 2 is formed through sputtering, sputtering may be carried out by use of an oxygen-containing process gas during a portion or the entirety of the film formation process. The process gas is preferably a gas mixture of argon and oxygen in which the ratio by volume of oxygen is about 0.05% to 50% (preferably about 0.1 to 20%).

When the surface of the soft magnetic undercoat film 2 is oxidized, magnetic fluctuation of the surface of the film 2 can be prevented, thereby preventing generation of noise attributed to the fluctuation. In addition, the crystal grains of the orientation-regulating film 3 formed on the soft magnetic undercoat film 2 can be micronized, and noise characteristics and read/write properties can be improved.

The oxidized portion (oxidized layer) on the surface of the soft magnetic undercoat film 2 prevents the material of the non-magnetic substrate 1 or the film 2 from being ionized and migrating to the surface of the medium, to thereby prevent corrosion of the surface of the medium.

In order to cause the soft magnetic undercoat film 2 to have the fine crystals 2a and the amorphous phase 2b, after the film 2 is formed, the film 2 is subjected to thermal treatment (annealing), to thereby form the fine crystals 2a having clear boundaries and the amorphous phase 2b. By virtue of the fine crystals 2a and the amorphous phase 2b, noise can be reduced, and read/write properties can be further improved.

The annealing temperature is 250° C. to 450° C. When the annealing temperature is lower than 250° C., the effect of reducing medium noise is lowered, whereas when the annealing temperature exceeds 450° C., the fine crystals 2a become large, and noise reduction effect is lowered.

No particular limitation is imposed on the annealing time, but the annealing time is preferably 2 to 50 seconds, more preferably 2 to 20 seconds.

No particular limitation is imposed on the cooling time after annealing, but, in consideration of productivity, the cooling time is preferably 50 seconds or less, more preferably 20 seconds or less.

When the orientation-regulating film 3 is formed, an oxidation film or a nitridation film may be formed on the surface of the film 3 through introduction of oxygen or nitrogen into film formation gas. For example, when the orientation-regulating film 3 is formed through sputtering, during formation of the vicinity of the surface of the film 3, sputtering may be carried out by use of a process gas (e.g., a gas mixture of argon and oxygen in which the ratio by volume of oxygen is about 0.05% to 50% (preferably about 0.1 to 20%), or a gas mixture of argon and nitrogen in which the ratio by volume of nitrogen is about 0.01% to 20% (preferably about 0.02 to 10%)), to thereby form the aforementioned oxidation-film or nitridation film.

In order to cause the perpendicular magnetic film 4 to have a single-layer structure, the film 4 may be formed by use of a single target containing the material of the film 4.

In order to cause the perpendicular magnetic film 4 to have a multi-layer structure including transition metal layer and noble metal layers, the film is formed by carrying out, in alternating fashion, sputtering by use of a first target containing a transition metal (e.g., Co or Co alloy) and sputtering by use of a second target containing a noble metal (e.g., Pt or Pd).

The protective film 5 may be formed through sputtering by use of a carbon target, CVD, or an ion-beam method.

The protective film 5 containing $SiO_2$ or $ZrO_2$ may be formed through RF sputtering by use of an $SiO_2$ or $ZrO_2$ target, or through reactive sputtering in which an Si or Zr target is employed and an oxygen-containing gas is employed as a process gas.

When the protective film 5 is formed through CVD or an ion-beam method, the resultant film 5 has considerably high hardness, and the thickness of the film 5 can be considerably reduced as compared with the case where the film 5 is formed through sputtering. Therefore, spacing loss (the distance equal to the flying height plus the thickness of the lubrication film and protective film) during read/write of data can be reduced, and high-density read/write can be attained.

In the magnetic recording medium of the first embodiment, since the soft magnetic undercoat film 2 is formed from any of the following materials, read/write properties can be improved.

$aFe-bCo-cM-dX1-fN$     (1)

($60 \leq a+b \leq 90$, $30 \leq a \leq 90$, $5 \leq c \leq 20$, $0.1 \leq d \leq 7$, and $3 \leq f \leq 30$)

$aFe-bCo-cM-eX2-fN$     (2)

($60 \leq a+b \leq 90$, $30 \leq a \leq 90$, $5 \leq c \leq 20$, $0.1 \leq e \leq 10$, and $3 \leq f \leq 30$)

$aFe-bCo-cM-dX1-eX2-fN$     (3)

($60 \leq a+b \leq 90$, $30 \leq a \leq 90$, $5 \leq c \leq 20$, $0.1 \leq d \leq 7$, $0.1 \leq e \leq 7$, and $3 \leq f \leq 30$)

The reason why read/write properties can be improved when the film 2 is formed from the aforementioned material will next be described.

Nitrogen exerts the effect of micronizing crystal grains in an Fe alloy film, and thus addition of nitrogen enables reduction of noise.

When M (one or more elements selected from the group consisting of Ti, Zr, Nb, Hf, Ta, V, and Mo) is added to FeN alloy, a compound in which M and N are bonded together can be generated. The compound containing M and N tends to segregate at grain boundaries. Therefore, addition of M can promote formation of grain boundaries, isolate crystal grains, and reduce noise.

X1 (one or more elements selected from the group consisting of Cr, Ga, Al, Si, and Ni) forms a solid solution in Fe, and prevents growth of Fe alloy crystals. Therefore, addition of X1 prevents excessive crystal growth in the soft magnetic undercoat film 2.

As a result, formation of large crystal grains can be prevented, and noise can be reduced.

X2 (P, C, B, or O) tends to segregate at grain boundaries, and forms a compound in which X2 is covalently bonded with Fe or M at grain boundaries. Therefore, addition of X2 can form grain boundaries containing the aforementioned covalent-bond compound. As a result, broad and stable grain boundaries can be formed, and excessive crystal growth can be prevented.

Therefore, crystal grains can be micronized and isolated, thereby attaining further noise reduction.

Even when either X1 or X2 is added, an effect of reducing medium noise can be obtained. However, when both X1 and X2 are added, a further excellent effect in reducing medium noise can be obtained.

For the above-described reasons, when the aforementioned material is employed, the crystal grains in the soft magnetic undercoat film 2 can be reduced in size, the crystal grains can be isolated, and noise attributed to the soft magnetic undercoat film 2 can be reduced.

Since the crystal grains can be isolated, interaction between the crystal grains can be prevented. Therefore, the magnetic clusters in the soft magnetic undercoat film 2 can be reduced in size, and noise attributed to the magnetic clusters can be reduced.

Since crystal grains can be micronized and isolated in the soft magnetic undercoat film 2, crystal grains can be micronized and isolated in the orientation-regulating film 3 and the perpendicular magnetic film 4, which are grown under the effect of the soft magnetic undercoat film 2. Therefore, medium noise can be further reduced.

In the aforementioned magnetic recording medium, during read/write of data, a closed magnetic circuit, in which magnetic flux circulates from a magnetic head through the perpendicular magnetic film 4 and the soft magnetic undercoat film 2 to the magnetic head, is formed.

Thus, since the soft magnetic undercoat film 2 and the perpendicular magnetic film 4 are magnetized by means of a common magnetic flux, the size of magnetic clusters in the perpendicular magnetic film 4 is affected by the size of magnetic clusters in the soft magnetic undercoat film 2. Therefore, magnetic clusters in the perpendicular magnetic film 4 are reduced in size, along with magnetic clusters in the soft magnetic undercoat film 2.

As described above, in the magnetic recording medium of the first embodiment, crystal grains and magnetic clusters in the soft magnetic undercoat film 2 and the perpendicular magnetic film 4 can be reduced in size, read/write properties can be improved, and high-density read/write of data can be attained.

The magnetic cluster size can be obtained by use of a magnetic force microscope (MFM). Specifically, after the soft magnetic undercoat film 2 is formed, the resultant medium is demagnetized by alternating current (AC); the magnetization state is measured by use of an MFM; and the diameter of clusters of crystal grains which are magnetized in substantially the same direction is obtained as the magnetic cluster size.

In the magnetic recording medium of the first embodiment, since the soft magnetic undercoat film 2 is formed from the materials represented by the aforementioned formulas (1) through (3), sufficient magnetization can be obtained in the soft magnetic undercoat film 2. Therefore, since the soft magnetic undercoat film 2 is not necessarily formed so as to have a large thickness, lowering of productivity can be prevented. In addition, since the surface roughness of the soft magnetic undercoat film 2 is reduced, deterioration of glide height characteristics can be prevented.

When the soft magnetic undercoat film 2 has the fine crystals 2a and the amorphous phase 2b containing M (M is one or more elements selected from the group consisting of Ti, Zr, Nb, Hf, Ta, V, and Mo) and N in amounts greater than those contained in the fine crystals 2a, the amorphous phase 2b becomes broad and stable, magnetic interaction between the fine crystals 2a is prevented, magnetic clusters can be reduced in size, and medium noise can be reduced.

The reason why the amorphous phase 2b becomes broad and stable is thought to be as follows. A compound in which M and N are bonded together is formed, and the resultant compound segregates in the amorphous phase 2b.

In the production process of the magnetic recording medium of the first embodiment, the soft magnetic undercoat film 2 is formed from the materials represented by the aforementioned formulas (1) through (3). Therefore, crystal grains in the soft magnetic undercoat film 2 and the perpendicular magnetic film 4 can be reduced in size, and noise attributed to the film 2 and film 4 can be reduced.

In addition, the magnetic clusters in the soft magnetic undercoat film 2 and the perpendicular magnetic film 4 can be reduced in size, and noise attributed to the magnetic clusters can be reduced.

Therefore, read/write properties can be improved, and high-density read/write of data can be attained.

Figure 5:
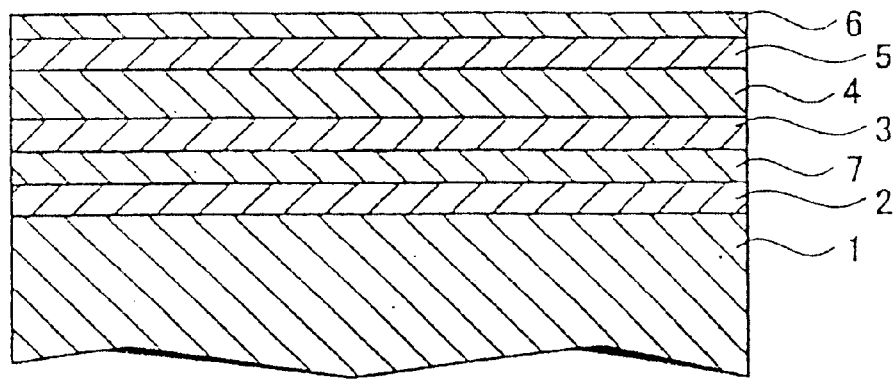
FIG. 5 is a partial cross-sectional view showing a second embodiment of the magnetic recording medium of the present invention.

FIG. 5 shows a second embodiment of the magnetic recording medium of the present invention. The magnetic recording medium of the second embodiment differs from the magnetic recording medium of the first embodiment in that an orientation-regulating undercoat film 7 is provided between a soft magnetic undercoat film 2 and an orientation-regulating film 3.

The orientation-regulating undercoat film 7 may be formed from a material containing, as primary components, one or more elements selected from the group consisting of Ti, Zn, Y, Zr, Ru, Re, Gd, Tb, and Hf.

The material of the orientation-regulating undercoat film 7 may be a material having a B2 structure.

Examples of the material having a B2 structure include a material containing, as primary components, one or more alloys selected from the group consisting of NiAl, FeAl, CoFe, CoZr, NiTi, AlCo, AlRu, and CoTi.

The orientation-regulating undercoat film 7 may be formed from a material containing the aforementioned alloys and another element such as Cr, Mo, Si, Mn, W, Nb, Ti, Zr, B, O, or N.

The thickness of the orientation-regulating undercoat film 7 is preferably 30 nm or less. When the thickness exceeds the above range, the distance between a perpendicular magnetic film 4 and the soft magnetic undercoat film 2 becomes large, resulting in deterioration of resolution and noise characteristics. The thickness of the orientation-regulating undercoat film 7 is preferably at least 0.1 nm.

Figure 6:
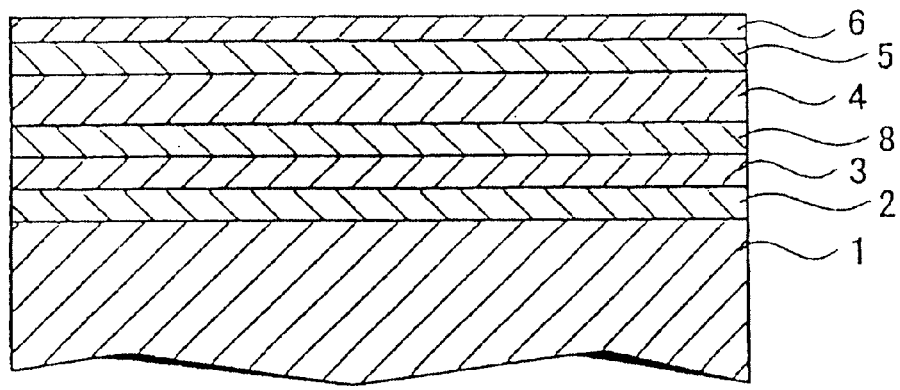
FIG. 6 is a partial cross-sectional view showing a third embodiment of the magnetic recording medium of the present invention.

FIG. 6 shows a third embodiment of the magnetic recording medium of the present invention. The magnetic recording medium of the third embodiment differs from the magnetic recording medium of the first embodiment shown in FIG. 1 in that a non-magnetic intermediate film 8 formed from a non-magnetic material is provided between an orientation-regulating film 3 and a perpendicular magnetic film 4.

The non-magnetic intermediate film 8 is preferably formed from a non-magnetic material having an hcp structure.

Preferred examples of the non-magnetic material include CoCr alloys, CoCrX5 alloys, and CoX5 alloys (X5 is one or more elements selected from the group consisting of Pt, Ta, Zr, Ru, Nb, Cu, Re, Ni, Mn, Ge, Si, O, N, and B).

The thickness of the non-magnetic intermediate film 8 is preferably 20 nm or less, more preferably 10 nm or less, in order to prevent deterioration of read/write properties, attributed to formation of large magnetic grains in the perpendicular magnetic film 4, and lowering of recording resolution attributed to an increase in the distance between a magnetic head and a soft magnetic undercoat film 2.

In the magnetic recording medium of the third embodiment, since the non-magnetic intermediate film 8 is provided, crystal orientation of the perpendicular magnetic film 4 can be improved, coercive force (Hc) can be enhanced, and read/write properties and thermal decay can be further improved.

Figure 7:
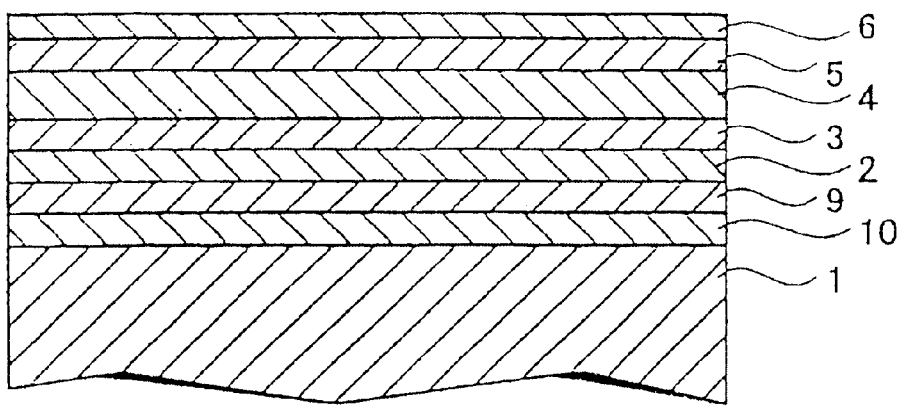
FIG. 7 is a partial cross-sectional view showing a fourth embodiment of the magnetic recording medium of the present invention.

FIG. 7 shows a fourth embodiment of the magnetic recording medium of the present invention. The magnetic recording medium of the fourth embodiment differs from the magnetic recording medium of the first embodiment shown in FIG. 1 in that a hard magnetic film 9 and a longitudinal undercoat film 10, in which easy-magnetization axes are oriented in a longitudinal direction, are provided between a non-magnetic substrate 1 and a soft magnetic undercoat film 2.

The material employed for forming the hard magnetic film 9 is preferably a CoCr alloy, particularly preferably CoCrX6 (X6 is one or more elements selected from the group consisting of Pt, Ta, Zr, Nb, Cu, Re, Ni, Mn, Ge, Si, O, N, and B). Alternatively, a CoSm alloy may be employed.

The coercive force (Hc) of the hard magnetic film 9 is preferably at least 1,000 (Oe), more preferably at least 2,000 (Oe).

The thickness of the hard magnetic film 9 is preferably 10 to 150 nm, more preferably 40 to 80 nm.

In order to prevent formation of magnetic domain walls in the soft magnetic undercoat film 2 in a radial direction of the substrate, preferably, the hard magnetic film 9 is magnetized in a direction radially extending from the center of the substrate, and exchange coupling is established between the hard magnetic film 9 and the soft magnetic undercoat film 2.

The longitudinal undercoat film 10 is provided directly below the hard magnetic film 9, and may be formed from Cr or a Cr alloy.

Examples of the Cr alloy employed for forming the longitudinal undercoat film 10 include CrMo-based alloys, CrTi-based alloys, CrW-based alloys, CrMo-based alloys, CrV-based alloys, CrSi-based alloys, and CrNb-based alloys.

When the hard magnetic film 9 is provided, formation of huge magnetic domains in the soft magnetic undercoat film 2 can be prevented. Therefore, generation of spike noise can be prevented even under a strong disturbance magnetic field, and the resultant magnetic recording medium exhibits excellent error rate characteristics and can attain high-density recording.

Figure 8:
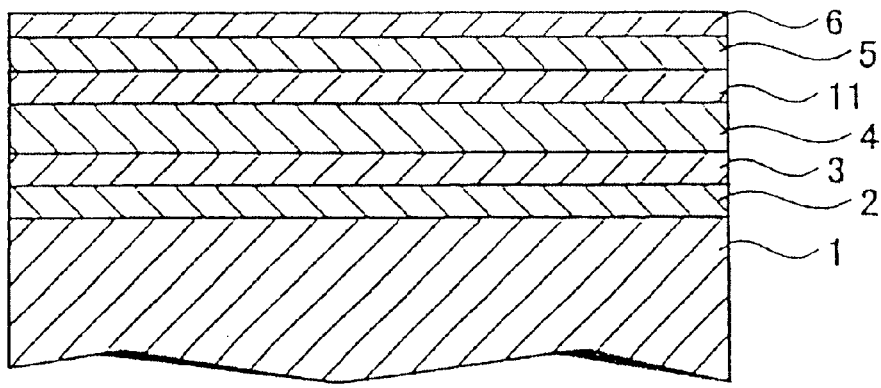
FIG. 8 is a partial cross-sectional view showing a fifth embodiment of the magnetic recording medium of the present invention.

FIG. 8 shows a fifth embodiment of the magnetic recording medium of the present invention. The magnetic recording medium shown in FIG. 8 differs from the magnetic recording medium of the first embodiment shown in FIG. 1 in that a magnetization-stabilizing film 11 is provided between a perpendicular magnetic film 4 and a protective film 5.

The magnetization-stabilizing film 11 may be formed from an Fe alloy containing Fe in an amount of at least 60 at %. Examples of the Fe alloy include FeCo-based alloys such as FeCo and FeCoV; FeNi-based alloys such as FeNi, FeNiMo, FeNiCr, and FeNiSi; FeAl-based alloys such as FeAl, FeAlSi, FeAlSiCr, and FeAlSiTiRu; FeCr-based alloys such as FeCr, FeCrTi, and FeCrCu; FeTa-based alloys such as FeTa and FeTaC; FeC-based alloys; FeN-based alloys; FeSi-based alloys; FeP-based alloys; FeNb-based alloys; and FeHf-based alloys.

The magnetization-stabilizing film 11 may contain fine crystals of FeAlO, FeMgO, FeTaN, or FeZrN. The film 11 may have a granular structure in which fine crystals are dispersed in a matrix.

The magnetization-stabilizing film 11 may be formed from a Co alloy containing Co in an amount of at least 80 at % and at least one element selected from the group consisting of Zr, Nb, Ta, Cr, Mo, etc. Preferred examples of the Co alloy include CoZr, CoZrNb, CoZrTa, CoZrCr, and CoZrMo.

The coercive force (Hc) of the magnetization-stabilizing film 11 is preferably 100 (Oe) or less, more preferably 50 (Oe) or less.

The saturated magnetic flux density (Bs) of the magnetization-stabilizing film 11 is preferably at least 0.4 T, more preferably at least 1 T.

The product of saturated magnetic flux density and thickness (Bs·t) of the magnetization-stabilizing film 11 is preferably 7.2 T·nm or less. When Bs·t exceeds the above range, reproduction output is lowered.

The maximum magnetic permeability of the magnetization-stabilizing film 11 is preferably 1,000 to 1,000,000, more preferably 10,000 to 500,000.

The material of the magnetization-stabilizing film 11 may be partially or completely oxidized. The material of the magnetization-stabilizing film 11 may be partially or completely oxidized at its surface which faces the protective film 5 or the perpendicular magnetic film 4 or at the vicinity of the surface.

In the fifth embodiment, since the magnetization-stabilizing film 11 is provided, thermal decay can be improved, and reproduction output can be increased.

The reason for an increase in reproduction output is thought be as follows. Since magnetic fluctuation on the surface of the perpendicular magnetic film 4 is prevented by virtue of the magnetization-stabilizing film 11, leakage magnetic flux is not affected by the fluctuation.

The improved thermal decay is thought to be explained as follows. When the magnetization-stabilizing film 11 is provided, a closed magnetic circuit is formed by perpendicular magnetization of the perpendicular magnetic film 4 and longitudinal magnetization of the soft magnetic undercoat film 2 and the magnetization-stabilizing film 11, and thus the perpendicular magnetic film 4 is more reliably magnetized in a perpendicular direction.

When the surface of the magnetization-stabilizing film 11 is oxidized, magnetic fluctuation of the surface of the film 11 can be prevented. Therefore, noise attributed to the magnetic fluctuation can be reduced, and read/write properties of the magnetic recording medium can be improved.

Figure 9:
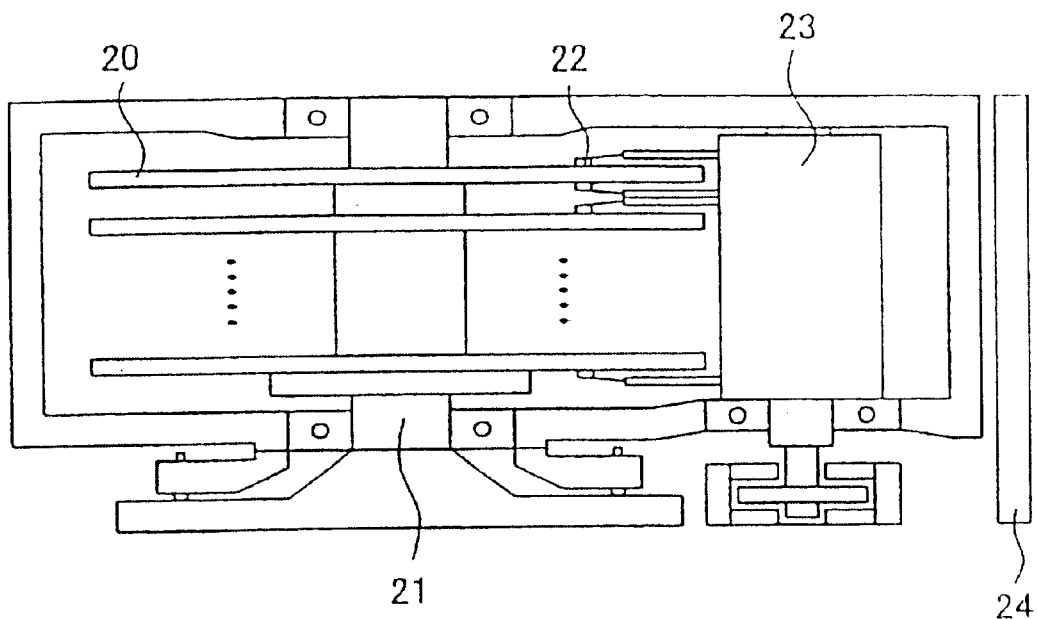
FIG. 9 is a schematic representation showing an embodiment of the magnetic recording and reproducing apparatus of the present invention.

FIG. 9 is a schematic representation showing an embodiment of the magnetic recording and reproducing apparatus of the present invention.

The apparatus shown in FIG. 9 includes a magnetic recording medium 20 having the aforementioned structure; a medium-driving section 21 which rotates the medium 20; a magnetic head 22 which is employed for recording of data onto the medium 20 and for reproduction of the data therefrom; a head-driving section 23 which drives the magnetic head 22; and a recorded/reproduced-signal-processing system 24.

In the recorded/reproduced-signal-processing system 24, input data are processed and recording signals are sent to the magnetic head 22, or reproduction signals from the head 22 are processed and the resultant data are output.

The magnetic head 22 may be a single-pole head.

Figure 10:
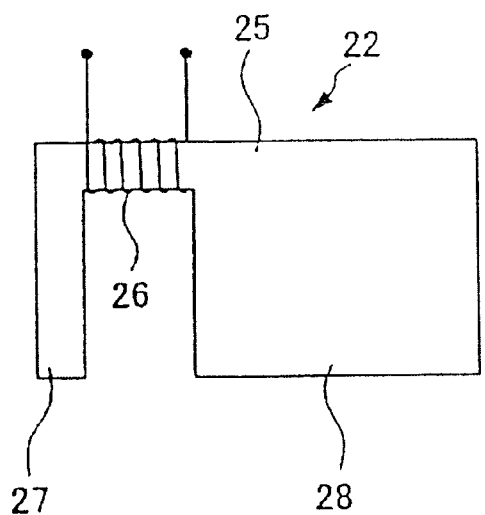
FIG. 10 shows the structure of an exemplary magnetic head employed in the magnetic recording and reproducing apparatus shown in FIG. 9.

FIG. 10 shows an example of the single-pole head 22. The single-pole head 22 includes a magnetic pole 25 and a coil 26. The magnetic pole 25 has a narrow main magnetic pole 27 and a broad auxiliary magnetic head 28, such that the magnetic pole 25 assumes a substantially U-like profile, one side of the U-shape being very thick. The main magnetic pole 27 generates a magnetic field which is applied to the perpendicular magnetic film 4 during recording of data, and detects magnetic flux from the perpendicular magnetic film 4 during reproduction of data.

When data are recorded onto the magnetic recording medium 20 by use of the single-pole head 22, the perpendicular magnetic film 4 is magnetized in a direction substantially perpendicular to the substrate 1 by means of magnetic flux generated from the tip of the main magnetic pole 27.

Since the magnetic recording medium 20 includes the soft magnetic undercoat film 2, a closed magnetic circuit, in which magnetic flux circulates from the main magnetic pole 27 of the single-pole head 22 through the perpendicular magnetic film 4 and the soft magnetic undercoat film 2 to the auxiliary magnetic pole 28, is formed.

Since the closed magnetic circuit is formed between the single-pole head 22 and the magnetic recording medium 20, the ratio of magnetic flux into the medium to magnetic flux from the head is enhanced, and high-density read/write can be attained.

The direction of magnetic flux between the soft magnetic undercoat film 2 and the auxiliary magnetic pole 28 becomes opposite that of magnetic flux between the main magnetic pole 27 and the soft magnetic undercoat film 2. However, since the area of the auxiliary magnetic pole 28 is sufficiently larger than that of the main magnetic pole 27, the density of magnetic flux from the auxiliary magnetic pole 28 becomes sufficiently low. Therefore, magnetization of the perpendicular magnetic film 4 is not affected by magnetic flux from the auxiliary magnetic pole 28.

The magnetic recording and reproducing apparatus of the present invention may employ a magnetic head other than a single-pole head; for example, a complex-type thin film magnetic recording head containing a giant magnetoresistive (GMR) element at the reproduction section.

In the magnetic recording and reproducing apparatus of the present invention, since the soft magnetic undercoat film 2 of the magnetic recording medium 20 is formed from the materials represented by the aforementioned formulas (1) through (3), crystal grains in the film 2 can be micronized and isolated, thereby reducing noise attributed to the film 2.

Furthermore, since the size of magnetic clusters in the soft magnetic undercoat film 2 can be reduced, the size of magnetic clusters in the perpendicular magnetic film 4 can be reduced. Therefore, noise attributed to the magnetic clusters can be reduced.

Thus, read/write properties can be improved, and high-density read/write of data can be attained.

EXAMPLES

Effects of the present invention will next be described in detail by way of Examples, which should not be construed as limiting the invention thereto.

Example 1

A glass substrate 1 (product of Ohara Inc., outer diameter: 2.5 inches), which had been washed, was placed in the film formation chamber of a DC magnetron sputtering apparatus (Model: C-3010, product of ANELVA), and the chamber was evacuated to 1×10⁻⁵ Pa. Thereafter, a soft magnetic undercoat film 2 (thickness: 100 nm) was formed on the glass substrate by use of a target containing 84Fe-13Hf-3Cr, in an atmosphere of a gas mixture of argon and nitrogen (nitrogen content: 5 vol %).

Subsequently, the soft magnetic undercoat film 2 was subjected to heat treatment (annealing) at 350° C. for 10 seconds.

The composition of the soft magnetic undercoat film 2 was determined by means of Auger electron spectroscopy (AES, product of JEOL, Japan), and was found to be 75Fe-11.6Hf-2.4Cr-11N. In addition, the soft magnetic undercoat film 2 was observed under a transmission electron microscope (TEM, product of Hitachi, Japan). As a result, the film 2 was found to have a structure including a number of fine crystals 2a and an amorphous phase 2b which isolates the fine crystals 2a from one another, and the average grain size of the fine crystals 2a was found to be 10 nm.

Furthermore, the saturated magnetic flux density (Bs) of the soft magnetic undercoat film 2 was measured by use of a vibrating sample magnetometer (VSM, product of Riken Denshi, Japan), and was found to be 1.5 T. In addition, Bs·T was found to be 150 T·nm.

Subsequently, an orientation-regulating undercoat film 7 containing 50Ni-50Al (thickness: 8 nm) and an orientation-regulating film 3 containing Ru (thickness: 10 nm) were successively formed on the soft magnetic undercoat film 2 at 200° C.

Subsequently, a perpendicular magnetic film 4 containing 65Co-17Cr-16Pt-2B (thickness: 25 nm) was formed.

The perpendicular magnetic film 4 was observed under a TEM, and, as a result, the average crystal grain size was found to be 9 nm.

Magnetostatic characteristics of the perpendicular magnetic film 4 were measured by use of a Kerr effect measurement apparatus, and the coercive force and the nucleation field (–Hn) were found to be 4,570 (Oe) and 750 (Oe), respectively.

During formation of the soft magnetic undercoat film 2, the orientation-regulating film 3, and the perpendicular magnetic film 4, argon was employed as a film formation process gas, and the pressure of the gas was controlled to 0.5 Pa.

Subsequently, a protective film 5 (thickness: 5 nm) was formed by means of CVD.

Subsequently, a lubrication film 6 containing perfluoropolyether was formed by means of dip coating, to thereby produce a magnetic recording medium.

In the description of the alloy materials, the expression "aA-bB" refers to "a(at %)A-b(at %)B." For example, the expression "65Co-17Cr-16Pt-2B" refers to "65at % Co-17at % Cr-16at % Pt-2at % B" (i.e., Co content: 65 at %, Cr content: 17 at %, Pt content: 16 at %, and B content: 2 at %).

Examples 2 through 15

The procedure of Example 1 was repeated, except that the composition of the soft magnetic undercoat film 2 was changed as shown in Table 1, to thereby produce magnetic recording media (see Table 1).

Comparative Examples 1 through 6

The procedure of Example 1 was repeated, except that the composition of the soft magnetic undercoat film 2 was changed as shown in Table 1, to thereby produce magnetic recording media (see Table 1).

Recording and reproduction characteristics of each of the magnetic recording media of Examples 1 through 15 and Comparative Examples 1 through 6 were evaluated. Recording and reproduction characteristics of the magnetic recording medium were measured by use of read/write analyzer RWA1632 and spin stand S1701MP (products of GUZIK, USA).

In order to evaluate read/write properties, measurement was performed by use, as a magnetic head, of a single-pole head for perpendicular recording at a track-recording density of 600 kFCI. The test results are shown in Table 1.

TABLE 1

| | Soft magnetic undercoat film | Orientation-regulating undercoat film | | Orientation-regulating film | | Perpendicular magnetic film | | Read/write properties Error rate |
|---|---|---|---|---|---|---|---|---|
| | Composition | Composition | Thickness | Composition | Thickness | Composition | Thickness | 10ˣ |
| Ex. 1 | 75Fe-11.6Hf-2.4Cr-11N | NiAl | 8 | Ru | 10 | 65Co17Cr16Pt2B | 25 | −6.5 |
| Ex. 2 | 75.2Fe-12.4Hf-0.2Cr-12.2N | NiAl | 8 | Ru | 10 | 65Co17Cr16Pt2B | 25 | −6.0 |
| Ex. 3 | 72.6Fe-9.8Hf-6.5Cr-11.1N | NiAl | 8 | Ru | 10 | 65Co17Cr16Pt2B | 25 | −6.1 |
| Ex. 4 | 74.9Fe-10.4Hf-2.4Al-12.3N | NiAl | 8 | Ru | 10 | 65Co17Cr16Pt2B | 25 | −6.3 |
| Ex. 5 | 74.1Fe-9.8Hf-2.8Si-13.3N | NiAl | 8 | Ru | 10 | 65Co17Cr16Pt2B | 25 | −6.1 |
| Ex. 6 | 73.2Fe-11Hf-3.2Ga-12.4N | NiAl | 8 | Ru | 10 | 65Co17Cr16Pt2B | 25 | −6.3 |
| Ex. 7 | 74.5Fe-11.6Hf-1.5Cr-0.8Al-11.6N | NiAl | 8 | Ru | 10 | 65Co17Cr16Pt2B | 25 | −6.5 |
| Ex. 8 | 75.3Fe-8.6Zr-2.4Cr-13.7N | NiAl | 8 | Ru | 10 | 65Co17Cr16Pt2B | 25 | −6.4 |
| Ex. 9 | 72.5Fe-10.6Ta-2.1Cr-14.8N | NiAl | 8 | Ru | 10 | 65Co17Cr16Pt2B | 25 | −6.4 |
| Ex. 10 | 72.2Fe-12.1Nb-2.9Cr-12.8N | NiAl | 8 | Ru | 10 | 65Co17Cr16Pt2B | 25 | −6.2 |
| Ex. 11 | 73.2Fe-11.2Ti-2.2Cr-13.4N | NiAl | 8 | Ru | 10 | 65Co17Cr16Pt2B | 25 | −5.9 |
| Ex. 12 | 75.4Fe-5.4Hf-2.4Cr-16.8N | NiAl | 8 | Ru | 10 | 65Co17Cr16Pt2B | 25 | −5.9 |
| Ex. 13 | 76.6Fe-17.6Hf-2.4Cr-3.4N | NiAl | 8 | Ru | 10 | 65Co17Cr16Pt2B | 25 | −5.9 |
| Ex. 14 | 63Fe-6.6Hf-1.1Cr-29.3N | NiAl | 8 | Ru | 10 | 65Co17Cr16Pt2B | 25 | −5.8 |
| Ex. 15 | 37Fe-32Co-14.6Hf-2.9Cr-13.5N | NiAl | 8 | Ru | 10 | 65Co17Cr16Pt2B | 25 | −6.3 |
| Comp. Ex. 1 | 76Fe-12.3Hf-11.7N | NiAl | 8 | Ru | 10 | 65Co17Cr16Pt2B | 25 | −4.2 |
| Comp. Ex. 2 | 68Fe-11.2Hf-7.8Cr-13N | NiAl | 8 | Ru | 10 | 65Co17Cr16Pt2B | 25 | −5.3 |
| Comp. Ex. 3 | 55Fe-17.8Hf-4.2Cr-23N | NiAl | 8 | Ru | 10 | 65Co17Cr16Pt2B | 25 | −5.1 |
| Comp. Ex. 4 | 64Fe-21.5Hf-3.7Cr-10.8N | NiAl | 8 | Ru | 10 | 65Co17Cr16Pt2B | 25 | −5.2 |

TABLE 1-continued

|  | Soft magnetic undercoat film | Orientation-regulating undercoat film | | Orientation-regulating film | | Perpendicular magnetic film | | Read/write properties Error rate |
|---|---|---|---|---|---|---|---|---|
|  | Composition | Composition | Thickness | Composition | Thickness | Composition | Thickness | $10^x$ |
| Comp. Ex. 5 | 84Fe-13Hf-3Cr | NiAl | 8 | Ru | 10 | 65Co17Cr16Pt2B | 25 | −4.2 |
| Comp. Ex. 6 | 60Fe-8.3Hf-0.5Cr-31.2N | NiAl | 8 | Ru | 10 | 65Co17Cr16Pt2B | 25 | −4.9 |

Thickness unit: nm

As is clear from Table 1, the magnetic recording media of Examples 1 through 15 in which the soft magnetic undercoat film 2 is formed from the material represented by the aforementioned formula (1) exhibit excellent read/write properties as compared with the magnetic recording media of Comparative Examples 1 through 6.

Examples 16 through 26

The procedure of Example 1 was repeated, except that the composition of the soft magnetic undercoat film 2 was changed as shown in Table 2, to thereby produce magnetic recording media (see Table 2).

Comparative Examples 7 and 8

The procedure of Example 1 was repeated, except that the composition of the soft magnetic undercoat film 2 was changed as shown in Table 2, to thereby produce magnetic recording media (see Table 2).

Recording and reproduction characteristics of each of the magnetic recording media of Examples 16 through 26 and Comparative Examples 7 and 8 were evaluated. The test results are shown in Table 2.

TABLE 2

|  | Soft magnetic undercoat film | Orientation-regulating undercoat film | | Orientation-regulating film | | Perpendicular magnetic film | | Read/write properties Error rate |
|---|---|---|---|---|---|---|---|---|
|  | Composition | Composition | Thickness | Composition | Thickness | Composition | Thickness | $10^x$ |
| Ex. 1 | 75Fe-11.6Hf-2.4Cr-11N | NiAl | 8 | Ru | 10 | 65Co17Cr16Pt2B | 25 | −6.5 |
| Ex. 16 | 74.9Fe-11.1Hf-2.7B-11.3N | NiAl | 8 | Ru | 10 | 65Co17Cr16Pt2B | 25 | −6.8 |
| Ex. 17 | 74.5Fe-12.1Hf-0.2B-13.2N | NiAl | 8 | Ru | 10 | 65Co17Cr16Pt2B | 25 | −5.9 |
| Ex. 18 | 72.7Fe-9.1Hf9.4B-8.8N | NiAl | 8 | Ru | 10 | 65Co17Cr16Pt2B | 25 | −5.8 |
| Ex. 19 | 74.5Fe-10.2Hf-2C-13.3N | NiAl | 8 | Ru | 10 | 65Co17Cr16Pt2B | 25 | −6.4 |
| Ex. 20 | 73.8Fe-11.1Hf-2.8P-12.3N | NiAl | 8 | Ru | 10 | 65Co17Cr16Pt2B | 25 | −6.6 |
| Ex. 21 | 73.9Fe-10.6Hf-3.4O-12.1N | NiAl | 8 | Ru | 10 | 65Co17Cr16Pt2B | 25 | −6.8 |
| Ex. 22 | 75.5Fe-10.3Hf-2.0B-1.1C-11.1N | NiAl | 8 | Ru | 10 | 65Co17Cr16Pt2B | 25 | −6.9 |
| Ex. 23 | 76.6Fe-9.1Zr-2.4B-11.9N | NiAl | 8 | Ru | 10 | 65Co17Cr16Pt2B | 25 | −6.3 |
| Ex. 24 | 74.4Fe-10.1Ta-2.1B-13.4N | NiAl | 8 | Ru | 10 | 65Co17Cr16Pt2B | 25 | −6.2 |
| Ex. 25 | 73.4Fe-11.8Nb-2.5B-12.3N | NiAl | 8 | Ru | 10 | 65Co17Cr16Pt2B | 25 | −6.4 |
| Ex. 26 | 74.6Fe-11.6Ti-2.2B-11.6N | NiAl | 8 | Ru | 10 | 65Co17Cr16Pt2B | 25 | −6.0 |
| Comp. Ex. 7 | 68.9Fe-10.1Hf-12.7B-8.3N | NiAl | 8 | Ru | 10 | 65Co17Cr16Pt2B | 25 | −4.9 |
| Comp. Ex. 8 | 68.4Fe-9.5Hf-12.8P 9.3N | NiAl | 8 | Ru | 10 | 65Co17Cr16Pt2B | 25 | −5.1 |

Thickness unit: nm

As is clear from Table 2, the magnetic recording media of Examples 16 through 26 in which the soft magnetic undercoat film 2 is formed from the material represented by the aforementioned formula (2) exhibit excellent read/write properties as compared with the magnetic recording media of Comparative Examples 7 and 8.

Examples 27 through 35

The procedure of Example 1 was repeated, except that the composition of the soft magnetic undercoat film 2 was changed as shown in Table 3, to thereby produce magnetic recording media (see Table 3).

Recording and reproduction characteristics of each of the magnetic recording media of Examples 27 through 35 were evaluated. The results are shown in Table 3.

TABLE 3

| | Soft magnetic undercoat film | Orientation-regulating undercoat film | | Orientation-regulating film | | Perpendicular magnetic film | | Read/write properties Error rate |
|---|---|---|---|---|---|---|---|---|
| | Composition | Composition | Thickness | Composition | Thickness | Composition | Thickness | $10^x$ |
| Ex. 1 | 75Fe-11.6Hf-2.4Cr-11N | NiAl | 8 | Ru | 10 | 65Co17Cr16Pt2B | 25 | −6.5 |
| Ex. 27 | 73.5Fe-10.6Hf-1.7Cr-1.9B-12.3N | NiAl | 8 | Ru | 10 | 65Co17Cr16Pt2B | 25 | −7.1 |
| Ex. 28 | 73.5Fe-10.6Hf-0.2Cr-2.3B-13.4N | NiAl | 8 | Ru | 10 | 65Co17Cr16Pt2B | 25 | −7.0 |
| Ex. 29 | 73.2Fe-9Hf-4.8Cr-1.5B-11.5N | NiAl | 8 | Ru | 10 | 65Co17Cr16Pt2B | 25 | −6.9 |
| Ex. 30 | 72.8Fe-10Hf-2.1Cr-0.2B-14.3N | NiAl | 8 | Ru | 10 | 65Co17Cr16Pt2B | 25 | −6.9 |
| Ex. 31 | 72.1Fe-8.6Hf-1.5Cr-6.8B-11N | NiAl | 8 | Ru | 10 | 65Co17Cr16Pt2B | 25 | −6.6 |
| Ex. 32 | 73.9Fe-10.4Hf-1.9Al-1.8B-12N | NiAl | 8 | Ru | 10 | 65Co17Cr16Pt2B | 25 | −7.0 |
| Ex. 33 | 73.4Fe-10.9Hf-1.6Al-2.2-11.9N | NiAl | 8 | Ru | 10 | 65Co17Cr16Pt2B | 25 | −7.3 |
| Ex. 34 | 73.9Fe-11.4Hf-1.2Cr-1.1Al-1.6B-10.8N | NiAl | 8 | Ru | 10 | 65Co17Cr16Pt2B | 25 | −7.1 |
| Ex. 35 | 72.3Fe-10.1Hf-1.7Cr-1.9B-0.9P-13.1N | NiAl | 8 | Ru | 10 | 65Co17Cr16Pt2B | 25 | −7.2 |

Thickness unit: nm

As is clear from Table 3, the magnetic recording media of Examples 27 through 35 in which the soft magnetic undercoat film 2 is formed from the material represented by the aforementioned formula (3) exhibit excellent read/write properties.

The results also show that the magnetic recording media of Examples 27 through 35 exhibit more excellent read/write properties as compared with the magnetic recording media of Examples 1 through 15 in which the soft magnetic undercoat film 2 is formed from the material of formula (1) (see Table 1), or the magnetic recording media of Examples 16 through 26 in which the soft magnetic undercoat film 2 is formed from the material of formula (2) (see Table 2).

Examples 36 through 39

The procedure of Example 1 was repeated, except that the composition, saturated magnetic flux density (Bs) and thickness (t) of the soft magnetic undercoat film 2 were changed as shown in Table 4, to thereby produce magnetic recording media (see Table 4).

Recording and reproduction characteristics of each of the magnetic recording media of Examples 36 through 39 were evaluated. The results are shown in Table 4.

TABLE 4

| | Soft magnetic undercoat film | | | | Orientation-regulating undercoat film | | Orientation-regulating film | | Perpendicular magnetic film | | Read/write properties Error rate |
|---|---|---|---|---|---|---|---|---|---|---|---|
| | Composition | Bs (T) | t (nm) | Bs · t (T · nm) | Composition | Thickness | Composition | Thickness | Composition | Thickness | $10^x$ |
| Ex. 1 | 75Fe-11.6Hf-2.4Cr-11N | 1.5 | 100 | 150 | NiAl | 8 | Ru | 10 | 65Co17Cr16Pt2B | 25 | −6.5 |
| Ex. 36 | 80Fe-8.6Hf-1.2Cr-10.2N | 1.8 | 85 | 153 | NiAl | 8 | Ru | 10 | 65Co17Cr16Pt2B | 25 | −6.5 |
| Ex. 37 | 71Fe-12.4Hf-4.4Cr-12.2N | 1.3 | 115 | 150 | NiAl | 8 | Ru | 10 | 65Co17Cr16Pt2B | 25 | −6.1 |
| Ex. 38 | 63Fe-17.8Hf-3.1Cr-18.1N | 1.0 | 150 | 150 | NiAl | 8 | Ru | 10 | 65Co17Cr16Pt2B | 25 | −5.9 |
| Ex. 39 | 60.3Fe-18.7Hf-6.8Cr-14.2N | 0.8 | 188 | 150 | NiAl | 8 | Ru | 10 | 65Co17Cr16Pt2B | 25 | −5.5 |

Thickness unit: nm

As is clear from Table 4, when the saturated magnetic flux density (Bs) is at least 1 T (particularly at least 1.4 T), the resultant magnetic recording media exhibit excellent read/write properties.

Examples 40 through 42

The procedure of Example 1 was repeated, except that the thickness (t) of the soft magnetic undercoat film 2 were changed as shown in Table 5, to thereby produce magnetic recording media (see Table 5).

Recording and reproduction characteristics of each of the magnetic recording media of Examples 40 through 42 were evaluated. The results are shown in Table 5.

TABLE 5

| | Soft magnetic undercoat film | | | | Orientation-regulating undercoat film | | Orientation-regulating film | | Perpendicular magnetic film | | Read/write properties Error rate |
| | Composition | Bs (T) | t (nm) | Bs·t (T·nm) | Composition | Thickness | Composition | Thickness | Composition | Thickness | $10^x$ |
|---|---|---|---|---|---|---|---|---|---|---|---|
| Ex. 1 | 75Fe-11.6Hf-2.4Cr-11N | 1.5 | 100 | 150 | NiAl | 8 | Ru | 10 | 65Co17Cr16Pt2B | 25 | −6.5 |
| Ex. 40 | 75Fe-11.6Hf-2.4Cr-11N | 1.5 | 30 | 45 | NiAl | 8 | Ru | 10 | 65Co17Cr16Pt2B | 25 | −5.8 |
| Ex. 41 | 75Fe-11.6Hf-2.4Cr-11N | 1.5 | 60 | 90 | NiAl | 8 | Ru | 10 | 65Co17Cr16Pt2B | 25 | −6.1 |
| Ex. 42 | 75Fe-11.6Hf-2.4Cr-11N | 1.5 | 70 | 105 | NiAl | 8 | Ru | 10 | 65Co17Cr16Pt2B | 25 | −6.5 |

Thickness unit: nm

As is clear from Table 5, when the product of saturated magnetic flux density (Bs) and thickness (t); i.e., Bs·t is at least 50 T·nm (particularly at least 100 T·nm), the resultant magnetic recording media exhibit excellent read/write properties.

Examples 43 through 54

The procedure of Example 1 was repeated, except that the material and thickness of the orientation-regulating undercoat film 7 and the orientation-regulating film 3 were changed as shown in Table 6, to thereby produce magnetic recording media (see Table 6).

Recording and reproduction characteristics of each of the magnetic recording media of Examples 43 through 54 were evaluated. The results are shown in Table 6.

Thermal decay of each of the magnetic recording media was evaluated. The results are shown in Table 7. In order to evaluate thermal decay, a signal was recorded onto the magnetic recording medium at 70° C. and at a track-recording density of 50 KFCI, and percent reduction of reproduction output (%/decade) on the basis of reproduction output one second after signal recording was calculated by use of the following formula: $(So-S) \times 100/(So \times 3)$ (wherein So represents reproduction output one second after recording of a signal onto the magnetic recording medium, and S represents reproduction output 1,000 seconds after recording of the signal).

Recording and reproduction characteristics of each of the magnetic recording media of Examples 55 through 63 were evaluated. The results are shown in Table 7.

TABLE 6

| | Soft magnetic undercoat film | Orientation-regulating undercoat film | | Orientation-regulating film | | Perpendicular magnetic film | | Read/write properties Error rate |
| | Composition | Composition | Thickness | Composition | Thickness | Composition | Thickness | $10^x$ |
|---|---|---|---|---|---|---|---|---|
| Ex. 1 | 75Fe-11.6Hf-2.4Cr-11N | NiAl | 8 | Ru | 10 | 65Co17Cr16Pt2B | 25 | −6.5 |
| Ex. 43 | 75Fe-11.6Hf-2.4Cr-11N | — | — | Ru | 2 | 65Co17Cr16Pt2B | 25 | −6.1 |
| Ex. 44 | 75Fe-11.6Hf-2.4Cr-11N | — | — | Ru | 18 | 65Co17Cr16Pt2B | 25 | −6.2 |
| Ex. 45 | 75Fe-11.6Hf-2.4Cr-11N | — | — | Ru | 45 | 65Co17Cr16Pt2B | 25 | −5.9 |
| Ex. 46 | 75Fe-11.6Hf-2.4Cr-11N | — | — | 70Ru30Cu | 18 | 65Co17Cr16Pt2B | 25 | −6.6 |
| Ex. 47 | 75Fe-11.6Hf-2.4Cr-11N | — | — | Hf | 18 | 65Co17Cr16Pt2B | 25 | −6.7 |
| Ex. 48 | 75Fe-11.6Hf-2.4Cr-11N | — | — | 80Hf20B | 18 | 65Co17Cr16Pt2B | 25 | −6.8 |
| Ex. 49 | 75Fe-11.6Hf-2.4Cr-11N | NiAl | 8 | Re | 8 | 65Co17Cr16Pt2B | 25 | −5.7 |
| Ex. 50 | 75Fe-11.6Hf-2.4Cr-11N | — | — | Ni | 3 | 65Co17Cr16Pt2B | 25 | −6.1 |
| Ex. 51 | 75Fe-11.6Hf-2.4Cr-11N | NiAl | 8 | Ni | 3 | 65Co17Cr16Pt2B | 25 | −6.1 |
| Ex. 52 | 75Fe-11.6Hf-2.4Cr-11N | — | — | 85Ni10Cr5N | 10 | 65Co17Cr16Pt2B | 25 | −6.3 |
| Ex. 53 | 75Fe-11.6Hf-2.4Cr-11N | — | — | Cu | 15 | 65Co17Cr16Pt2B | 25 | −5.5 |
| Ex. 54 | 75Fe-11.6Hf-2.4Cr-11N | — | — | 80Pd20B | 10 | 65Co17Cr16Pt2B | 25 | −5.4 |

Thickness unit: nm

As is clear from Table 6, when the orientation-regulating film 3 is formed from a material having an hcp structure or an fcc structure (particularly Ru, Hf, an Ru alloy, an Hf alloy, Ni, or an Ni alloy), the resultant magnetic recording media exhibit excellent read/write properties.

Examples 55 through 63

The procedure of Example 1 was repeated, except that the material and thickness of the perpendicular magnetic film 4 were changed as shown in Table 7, to thereby produce magnetic recording media (see Table 7).

TABLE 7

| | Soft magnetic undercoat film Composition | Orientation-regulating undercoat film Composition | Thickness | Orientation-regulating film Composition | Thickness | Perpendicular magnetic film Composition | Thickness | Read/write properties Error rate $10^x$ | Thermal decay (%/decade) |
|---|---|---|---|---|---|---|---|---|---|
| Ex. 1 | 75Fe-11.6Hf-2.4Cr-11N | NiAl | 8 | Ru | 10 | 65Co17Cr16Pt2B | 25 | −6.5 | 0.65 |
| Ex. 55 | 75Fe-11.6Hf-2.4Cr-11N | NiAl | 8 | Ru | 10 | 65Co17Cr16Pt2B | 3 | −4.9 | 1.03 |
| Ex. 56 | 75Fe-11.6Hf-2.4Cr-11N | NiAl | 8 | Ru | 10 | 65Co17Cr16Pt2B | 8 | −6.0 | 0.88 |
| Ex. 57 | 75Fe-11.6Hf-2.4Cr-11N | NiAl | 8 | Ru | 10 | 65Co17Cr16Pt2B | 45 | −5.8 | 0.55 |
| Ex. 58 | 75Fe-11.6Hf-2.4Cr-11N | NiAl | 8 | Ru | 10 | 65Co17Cr16Pt2B | 60 | −5.1 | 0.52 |
| Ex. 59 | 75Fe-11.6Hf-2.4Cr-11N | NiAl | 8 | Ru | 10 | 62Co19Cr15Pt3Mn | 25 | −6.1 | 0.71 |
| Ex. 60 | 75Fe-11.6Hf-2.4Cr-11N | NiAl | 8 | Ru | 10 | 68Co21Cr6Pt5B | 25 | −6.3 | 1.08 |
| Ex. 61 | 75Fe-11.6Hf-2.4Cr-11N | NiAl | 8 | Ru | 10 | 61Co17Cr21Pt | 25 | −5.6 | 0.49 |
| Ex. 62 | 75Fe-11.6Hf-2.4Cr-11N | NiAl | 8 | Ru | 10 | Co/Pd(*1) | 15 | −5.3 | 0.36 |
| Ex. 63 | 75Fe-11.6Hf-2.4Cr-11N | NiAl | 8 | Ru | 10 | TbFeCo | 25 | −5.1 | 0.64 |

Thickness unit: nm
(*1: Multi-layer structure film in which Co layers and Pd layers are laminated repeatedly)

As is clear from Table 7, when the thickness of the perpendicular magnetic film 4 is 5 to 50 nm (particularly 7 to 30 nm), the resultant magnetic recording media exhibit excellent read/write properties.

The results also show that, in the case where the perpendicular magnetic film 4 is formed from a CoCrPt alloy, when the Pt content is 8 to 24 at %, the resultant magnetic recording media exhibit excellent thermal decay.

Examples 64 through 67

The procedure of Example 1 was repeated, except that the surface of the soft magnetic undercoat film 2 was exposed to an oxygen-containing gas (an exposure gas) so as to subject the film 2 to oxidation treatment, to thereby produce magnetic recording media. Pure oxygen (100% $O_2$) or a gas mixture of oxygen and argon (50 vol % $O_2$–50 vol % Ar) was employed as the exposure gas.

The thickness of a layer formed on the surface of the soft magnetic undercoat film 2 through the above exposure; i.e., the thickness of an oxidized layer, is shown in Table 8.

Recording and reproduction characteristics of each of the magnetic recording media of Examples 64 through 67 were evaluated. The results are shown in Table 8.

Example 68

The procedure of Example 1 was repeated, except that, when the soft magnetic undercoat film 2 was formed, Ar (100%) was employed as a process gas (a film formation gas), and then a gas mixture of oxygen and argon (mixing ratio: 10 vol % $O_2$–90 vol % Ar) was employed as a process gas, to thereby produce a magnetic recording medium (see Table 8).

Through use of the gas mixture of oxygen and argon, an oxidized layer was formed in the vicinity of the surface of the soft magnetic undercoat film 2. The thickness of the oxidized layer is shown in Table 8.

Recording and reproduction characteristics of the magnetic recording medium of Example 68 were evaluated. The results are shown in Table 8.

TABLE 8

| | Soft magnetic undercoat film | | | | Orientation-regulating undercoat film | |
|---|---|---|---|---|---|---|
| | Composition | Exposure gas (Process gas) | Oxidation | Oxidized layer thickness | Composition | Thickness |
| Ex. 1 | 75Fe-11.6Hf-2.4Cr-11N | — | — | — | NiAl | 8 |
| Ex. 64 | 75Fe-11.6Hf-2.4Cr-11N | 100% $O_2$ | Exposure | 0.5 | NiAl | 8 |
| Ex. 65 | 75Fe-11.6Hf-2.4Cr-11N | 100% $O_2$ | Exposure | 2.5 | NiAl | 8 |
| Ex. 66 | 75Fe-11.6Hf-2.4Cr-11N | 100% $O_2$ | Exposure | 4 | NiAl | 8 |
| Ex. 67 | 75Fe-11.6Hf-2.4Cr-11N | 50% $O_2$–50% Ar | Exposure | 1 | NiAl | 8 |
| Ex. 68 | 75Fe-11.6Hf-2.4Cr-11N | 10% $O_2$–90% Ar | *1 | 1 | NiAl | 8 |

*1: During formation of soft magnetic undercoat film, 100% Ar was employed as a process gas, and then 10% $O_2$–90% Ar was employed.

| | Orientation-regulating film | | Perpendicular magnetic film | | Read/write properties |
|---|---|---|---|---|---|
| | Composition | Thickness | Composition | Thickness | Error rate $10^x$ |
| Ex. 1 | Ru | 10 | 65Co17Cr16Pt2B | 25 | −6.1 |
| Ex. 64 | Ru | 10 | 65Co17Cr16Pt2B | 25 | −7.1 |
| Ex. 65 | Ru | 10 | 65Co17Cr16Pt2B | 25 | −6.9 |
| Ex. 66 | Ru | 10 | 65Co17Cr16Pt2B | 25 | −6.1 |

TABLE 8-continued

|  |  |  |  |  |  |
|---|---|---|---|---|---|
| Ex. 67 | Ru | 10 | 65Co17Cr16Pt2B | 25 | −6.8 |
| Ex. 68 | Ru | 10 | 65Co17Cr16Pt2B | 25 | −6.7 |

Thickness unit: nm

As is clear from Table 8, when the soft magnetic undercoat film 2 is oxidized, the resultant magnetic recording media exhibit excellent read/write properties.

Examples 69 through 76

The procedure of Example 1 was repeated, except that a non-magnetic intermediate film 8 was provided between the orientation-regulating film 3 and the perpendicular magnetic film 4, to thereby produce magnetic recording media (see Table 9).

Recording and reproduction characteristics and thermal decay of each of the magnetic recording media of Examples 69 through 76 were evaluated. The results are shown in Table 9.

were provided between the non-magnetic substrate 1 and the soft magnetic undercoat film 2, to thereby produce magnetic recording media (see Table 10).

The longitudinal undercoat film 10 was formed from 94Cr6Mo, and the thickness of the film 10 was 15 nm.

Recording and reproduction characteristics of each of the magnetic recording media of Examples 77 through 81 were evaluated. The results are shown in Table 10. Table 10 also indicates whether or not spike noise was generated.

TABLE 9

|  | Soft magnetic undercoat film | Orientation-regulating undercoat film | | Orientation-regulating film | |
|---|---|---|---|---|---|
|  | Composition | Composition | Thickness | Composition | Thickness |
| Ex. 1 | 75Fe-11.6Hf-2.4Cr-11N | NiAl | 8 | Ru | 10 |
| Ex. 69 | 75Fe-11.6Hf-2.4Cr-11N | NiAl | 8 | Ru | 10 |
| Ex. 70 | 75Fe-11.6Hf-2.4Cr-11N | NiAl | 8 | Ru | 10 |
| Ex. 71 | 75Fe-11.6Hf-2.4Cr-11N | NiAl | 8 | Ru | 10 |
| Ex. 72 | 75Fe-11.6Hf-2.4Cr-11N | NiAl | 8 | Ru | 10 |
| Ex. 73 | 75Fe-11.6Hf-2.4Cr-11N | NiAl | 8 | Ru | 10 |
| Ex. 74 | 75Fe-11.6Hf-2.4Cr-11N | NiAl | 8 | Ru | 10 |
| Ex. 75 | 75Fe-11.6Hf-2.4Cr.11N | NiAl | 8 | Ru | 10 |
| Ex. 76 | 75Fe-11.6Hf-2.4Cr-11N | NiAl | 8 | Ru | 10 |

|  | Non-magnetic intermediate film | | Perpendicular magnetic film | | Read/write properties Error rate | Thermal decay |
|---|---|---|---|---|---|---|
|  | Composition | Thickness | Composition | Thickness | $10^x$ | (%/decade) |
| Ex. 1 | — | — | 65Co17Cr16Pt2B | 25 | −6.5 | 0.65 |
| Ex. 69 | 60Co40Cr | 5 | 65Co17Cr16Pt2B | 25 | −6.8 | 0.55 |
| Ex. 70 | 60Co40Cr | 2 | 65Co17Cr16Pt2B | 25 | −6.8 | 0.57 |
| Ex. 71 | 60Co40Cr | 18 | 65Co17Cr16Pt2B | 25 | −6.7 | 0.52 |
| Ex. 72 | 60Co40Cr | 25 | 65Co17Cr16Pt2B | 25 | −6.5 | 0.52 |
| Ex. 73 | 55Co35Cr10Mn | 5 | 65Co17Cr16Pt2B | 25 | −6.9 | 0.56 |
| Ex. 74 | 52Co33Cr10Pt5B | 5 | 65Co17Cr16Pt2B | 25 | −7.0 | 0.55 |
| Ex. 75 | 55Co45Ru | 5 | 65Co17Cr16Pt2B | 25 | −6.9 | 0.58 |
| Ex. 76 | 60Co30Cr5Ta5B | 5 | 65Co17Cr16Pt2B | 25 | −6.9 | 0.54 |

Thickness unit: nm

As is clear from Table 9, when the non-magnetic intermediate film 8 is provided, the resultant magnetic recording media exhibit improved read/write properties and thermal decay.

The results show that when the thickness of the non-magnetic intermediate film 8 is 20 nm or less (particularly 10 nm or less), the resultant magnetic recording media exhibit excellent read/write properties.

Examples 77 through 81

The procedure of Example 1 was repeated, except that a hard magnetic film 9 and a longitudinal undercoat film 10

TABLE 10

| | Hard magnetic film | | Soft magnetic undercoat film | Orientation-regulating undercoat film | |
|---|---|---|---|---|---|
| | Composition | Thickness | Composition | Composition | Thickness |
| Ex. 1 | — | — | 75Fe–11.6Hf–2.4Cr–11N | NiAl | 8 |
| Ex. 77 | 65Co17Cr16Pt2B | 50 | 75Fe–11.6Hf–2.4Cr–11N | NiAl | 8 |
| Ex. 78 | 65Co17Cr16Pt2B | 20 | 75Fe–11.6Hf–2.4Cr–11N | NiAl | 8 |
| Ex. 79 | 65Co17Cr16Pt2B | 140 | 75Fe–11.6Hf–2.4Cr–11N | NiAl | 8 |
| Ex. 80 | 64Co21Cr10Pt5B | 50 | 75Fe–11.6Hf–2.4Cr–11N | NiAl | 8 |
| Ex. 81 | 84Co16Sm | 50 | 75Fe–11.6Hf–2.4Cr–11N | NiAl | 8 |

| | Orientation-regulating film | | Perpendicular magnetic film | | Read/write properties Error rate | Spike |
|---|---|---|---|---|---|---|
| | Composition | Thickness | Composition | Thickness | $10^x$ | noise |
| Ex. 1 | Ru | 10 | 65Co17Cr16Pt2B | 25 | −6.5 | *1 |
| Ex. 77 | Ru | 10 | 65Co17Cr16Pt2B | 25 | −6.4 | No |
| Ex. 78 | Ru | 10 | 65Co17Cr16Pt2B | 25 | −6.5 | No |
| Ex. 79 | Ru | 10 | 65Co17Cr16Pt2B | 25 | −6.1 | No |
| Ex. 80 | Ru | 10 | 65Co17Cr16Pt2B | 25 | −6.4 | No |
| Ex. 81 | Ru | 10 | 65Co17Cr16Pt2B | 25 | −6.0 | No |

Thickness unit: nm
*1: A small amount of spike noise was observed

As is clear from Table 10, when the hard magnetic film 9 and the longitudinal undercoat film 10 are provided, generation of spike noise is prevented. The results also show that the magnetic recording media exhibit sufficient read/write properties.

Examples 82 through 86

The procedure of Example 1 was repeated, except that a magnetization-stabilizing film 11 was provided between the perpendicular magnetic film 4 and the protective film 5, to thereby produce magnetic recording media (see Table 11).

Recording and reproduction characteristics of each of the magnetic recording media of Examples 82 through 86 were evaluated. The results are shown in Table 11.

TABLE 11

| | Soft magnetic undercoat film | Orientation-regulating undercoat film | | Orientation-regulating film | | Perpendicular magnetic film |
|---|---|---|---|---|---|---|
| | Composition | Composition | Thickness | Composition | Thickness | |
| Ex. 1 | 75Fe–11.6Hf–2.4Cr–11N | NiAl | 8 | Ru | 10 | (*1 |
| Ex. 82 | 75Fe–11.6Hf–2.4Cr–11N | NiAl | 8 | Ru | 10 | (*1 |
| Ex. 83 | 75Fe–11.6Hf–2.4Cr–11N | NiAl | 8 | Ru | 10 | (*1 |
| Ex. 84 | 75Fe–11.6Hf–2.4Cr–11N | NiAl | 8 | Ru | 10 | (*1 |
| Ex. 85 | 75Fe–11.6Hf–2.4Cr–11N | NiAl | 8 | Ru | 10 | (*1 |
| Ex. 86 | 75Fe–11.6Hf–2.4Cr–11N | NiAl | 8 | Ru | 10 | (*1 |

| | Magnetization-stabilizing film | | Read/write properties | | |
|---|---|---|---|---|---|
| | | | Error rate | Readback signal | Thermal decay |
| | Composition | Thickness | $10^x$ | ($\mu$V) | (%/decade) |
| Ex. 1 | — | — | −6.5 | 2180 | 0.65 |
| Ex. 82 | 75Fe–11.6Hf–2.4Cr–11N | 3.6 | −6.7 | 2870 | 0.45 |
| Ex. 83 | 75Fe–11.6Hf–2.4Cr–11N | 7.0 | −6.2 | 2350 | 0.53 |
| Ex. 84 | 75Fe–11.6Hf–2.4Cr–11N | 9.6 | −5.7 | 1780 | 0.74 |
| Ex. 85 | 85Fe–15Zr | 3.6 | −6.4 | 2660 | 0.52 |
| Ex. 86 | 89Co–4Zr–7Nb | 3.6 | −6.5 | 2720 | 0.51 |

Thickness unit: nm
(*1: Perpendicular magnetic film; 65Co17Cr16Pt2B, thickness: 25 nm As is clear from Table 11, when the magnetization-stabilizing film 11 is provided, the resultant magnetic recording media exhibit improved read/write properties, reproduction output, and thermal decay.

Industrial Applicability

As described above, in the magnetic recording medium of the present invention, since the soft magnetic undercoat film is formed from any of the following materials, read/write properties can be improved.

$$aFe\text{-}bCo\text{-}cM\text{-}dX1\text{-}fN \quad (1)$$

$(60 \leq a+b \leq 90,\ 30 \leq a \leq 90,\ 5 \leq c \leq 20,\ 0.1 \leq d \leq 7,\ \text{and}\ 3 \leq f \leq 30)$ $$aFe\text{-}bCo\text{-}cM\text{-}eX2\text{-}fN \quad (2)$$

$(60 \leq a+b \leq 90,\ 30 \leq a \leq 90,\ 5 \leq c \leq 20,\ 0.1 \leq e \leq 10,\ \text{and}\ 3 \leq f \leq 30)$ $$aFe\text{-}bCo\text{-}cM\text{-}dX1\text{-}eX2\text{-}fN \quad (3)$$

$(60 \leq a+b \leq 90,\ 30 \leq a \leq 90,\ 5 \leq c \leq 20,\ 0.1 \leq d \leq 7,\ 0.1 \leq e \leq 7,\ \text{and}\ 3 \leq f \leq 30)$ While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic substrate; a soft magnetic undercoat film containing at least a soft magnetic material; an orientation-regulating film for regulating the crystal orientation of a film provided directly thereon; a perpendicular magnetic film in which easy-magnetization axes are mostly oriented vertically with respect to the substrate; and a protective film, the films being formed on the substrate, wherein the soft magnetic undercoat film contains a material represented by the following composition:

$$aFe\text{-}bCo\text{-}cM\text{-}dX1\text{-}fN$$

wherein M is one or more elements selected from the group consisting of Ti, Zr, Nb, Hf, Ta, V, and Mo; X1 is one or more elements selected from the group consisting of Cr, Ga, Al, Si, and Ni; and a, b, c, d, and f represent atomic percentages and satisfy the following relations: $60 \leq a+b \leq 90$, $30 \leq a \leq 90$, $5 \leq c \leq 20$, $0.1 \leq d \leq 7$, and $3 \leq f \leq 30$.

2. A magnetic recording medium comprising a non-magnetic substrate; a soft magnetic undercoat film containing at least a soft magnetic material; an orientation-regulating film for regulating the crystal orientation of a film provided directly thereon; a perpendicular magnetic film in which easy-magnetization axes are mostly oriented vertically with respect to the substrate; and a protective film, the films being formed on the substrate, wherein the soft magnetic undercoat film contains a material represented by the following composition:

$$aFe\text{-}bCo\text{-}cM\text{-}eX2\text{-}fN$$

wherein M is one or more elements selected from the group consisting of Ti, Zr, Nb, Hf, Ta, V, and Mo; X2 is one or more elements selected from the group consisting of P, C, B, and O; and a, b, c, e, and f represent atomic percentages and satisfy the following relations: $60 \leq a+b \leq 90$, $30 \leq a \leq 90$, $5 \leq c \leq 20$, $0.1 \leq e \leq 10$, and $3 \leq f \leq 30$.

3. A magnetic recording medium comprising a non-magnetic substrate; a soft magnetic undercoat film containing at least a soft magnetic material; an orientation-regulating film for regulating the crystal orientation of a film provided directly thereon; a perpendicular magnetic film in which easy-magnetization axes are mostly oriented vertically with respect to the substrate; and a protective film, the films being formed on the substrate, wherein the soft magnetic undercoat film contains a material represented by the following composition:

$$aFe\text{-}bCo\text{-}cM\text{-}dX1\text{-}eX2\text{-}fN$$

wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O; and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$.

4. The magnetic recording medium according to claim 3, wherein a through f satisfy the following relations: $60 \leq a+b \leq 80$, $30 \leq a \leq 80$, $5 \leq c \leq 20$, $0.1 \leq d \leq 3$, $0.1 \leq e \leq 5$, and $8 \leq f \leq 25$.

5. The magnetic recording medium according to any one of claims 1 to 3, wherein the soft magnetic undercoat film comprises fine crystals containing Fe as a primary component and having an average grain size of 13 nm or less, and an amorphous phase containing M (M is one or more elements selected from the group consisting of Ti, Zr, Nb, Hf, Ta, V, and Mo) and N in amounts greater than those contained in the fine crystals.

6. The magnetic recording medium according to claim 5, wherein the fine crystals have a bcc structure.

7. The magnetic recording medium according to any one of claims 1 to 3, wherein the soft magnetic undercoat film has a saturated magnetic flux density (Bs) of at least 1 T.

8. The magnetic recording medium according to any one of claims 1 to 3, wherein the soft magnetic undercoat film has a saturated magnetic flux density (Bs) of at least 1.4 T.

9. A magnetic recording medium according to any one of claims 1 to 3, wherein the product of the saturated magnetic flux density (Bs) and thickness (t) of the soft magnetic undercoat film is at least 50 T·nm.

10. The magnetic recording medium according to any one of claims 1 to 3, wherein the product of the saturated magnetic flux density (Bs) and thickness (t) of the soft magnetic undercoat film is at least 100 T·nm.

11. The magnetic recording medium according to any one of claims 1 to 3, wherein the orientation-regulating film comprises an hcp-structure material containing one or more elements selected from the group consisting of Ti, Zn, Y, Zr, Ru, Re, Gd, Tb, and Hf in a total amount of at least 50 at %.

12. The magnetic recording medium according to any one of claims 1 to 3, wherein the orientation-regulating film comprises an fcc-structure material containing one or more elements selected from the group consisting of Ni, Cu, Pd, Ag, Pt, Ir, Au, and Al in a total amount of at least 50 at %.

13. The magnetic recording medium according to any one of claims 1 to 3, wherein a portion or the entirety of a surface of the soft magnetic undercoat film facing the perpendicular magnetic film is oxidized.

14. The magnetic recording medium according to any one of claims 1 to 3, wherein the perpendicular magnetic film has a nucleation field (−Hn) of at least 0 (Oe).

15. A process for producing a magnetic recording medium, which comprises forming, in order, on a non-magnetic substrate, a soft magnetic undercoat film containing at least a soft magnetic material, an orientation-regulating film for regulating the crystal orientation of a film provided directly thereon, a perpendicular magnetic film in which easy-magnetization axes are mostly oriented vertically with respect to the substrate, and a protective film, wherein the soft magnetic undercoat film contains a material represented by the following composition:

aFe-bCo-cM-dX1-eX2-fN wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O; and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$.

16. A process for producing a magnetic recording medium according to claim 15, wherein the soft magnetic undercoat film comprises fine crystals containing Fe as a primary component and having an average grain size of 13 nm or less, and an amorphous phase containing M (M is one or more elements selected from the group consisting of Ti, Zr, Nb, Hf, Ta, V, and Mo) and N in amounts greater than those contained in the fine crystals.

17. A process for producing a magnetic recording medium according to claim 15 or 16, wherein the soft magnetic undercoat film is formed through sputtering, and a gas employed for film formation contains nitrogen in an amount of 0.1 to 50 vol %.

18. A process for producing a magnetic recording medium according to any one of claims 15 or 16, wherein, after the soft magnetic undercoat film is formed, subjecting the soft magnetic undercoat film to heat treatment at 250° C. to 450° C.

19. A magnetic recording and reproducing apparatus comprising a magnetic recording medium and a magnetic head for recording data onto the medium and reproducing the data therefrom, wherein the magnetic head is a single-pole head, and the magnetic recording medium comprises a non-magnetic substrate, a soft magnetic undercoat film containing at least a soft magnetic material, an orientation-regulating film for regulating the crystal orientation of a film provided directly thereon, a perpendicular magnetic film in which easy-magnetization axes are mostly oriented vertically with respect to the substrate, and a protective film, the films being formed on the substrate, wherein the soft magnetic undercoat film contains a material represented by the following composition:

aFe-bCo-cM-dX1-eX2-fN wherein M is one or more elements selected from the group consisting of Ti, Zr, Nb, Hf, Ta, V, and Mo; X1 is one or more elements selected from the group consisting of Cr, Ga, Al, Si, and Ni; X2 is one or more elements selected from the group consisting of P, C, B, and O; and a, b, c, d, e, and f represent atomic percentages and satisfy the following relations: $60 \leq a+b \leq 90$, $30 \leq a \leq 90$, $5 \leq c \leq 20$, $0.1 \leq d \leq 7$, $0.1 \leq e \leq 7$, and $3 \leq f \leq 30$.

20. A magnetic recording and reproducing apparatus according to claim 19, wherein the soft magnetic undercoat film comprises fine crystals containing Fe as a primary component and having an average grain size of 13 nm or less, and an amorphous phase containing M, wherein M is one or more elements selected from the group consisting of Ti, Zr, Nb, Hf, Ta, V, and Mo and N in amounts greater than those contained in the fine crystals.

21. A process for producing a magnetic recording medium according to claim 17, wherein, after the soft magnetic undercoat film is formed, subjecting the soft magnetic undercoat film to heat treatment at 250° C. to 450° C.

* * * * *